(12) United States Patent
Kaku

(10) Patent No.: US 7,035,976 B2
(45) Date of Patent: Apr. 25, 2006

(54) CONTENT RECORDING APPARATUS

(75) Inventor: Junya Kaku, Hyogo (JP)

(73) Assignee: Sanyo Electric Co., Ltd., Osaka (JP)

( * ) Notice: Subject to any disclaimer, the term of this patent is extended or adjusted under 35 U.S.C. 154(b) by 160 days.

(21) Appl. No.: 10/250,726

(22) PCT Filed: Dec. 25, 2001

(86) PCT No.: PCT/JP01/11413

§ 371 (c)(1),
(2), (4) Date: Jul. 9, 2003

(87) PCT Pub. No.: WO02/056178

PCT Pub. Date: Jul. 18, 2002

(65) Prior Publication Data

US 2004/0064629 A1 Apr. 1, 2004

(30) Foreign Application Priority Data

Jan. 12, 2001 (JP) .............................. 2001-004363

(51) Int. Cl.
*G06F 12/00* (2006.01)
(52) U.S. Cl. ..................... 711/115; 711/4; 711/112; 711/114; 345/541; 345/542; 345/543
(58) Field of Classification Search .................... 711/4, 711/100, 112, 114–115, 170–173; 345/541–547
See application file for complete search history.

(56) References Cited

U.S. PATENT DOCUMENTS 5,287,478 A * 2/1994 Johnston et al. ............. 711/111
5,719,886 A * 2/1998 Matsui et al. ................ 714/763
5,878,188 A * 3/1999 Amada et al. ............... 386/101
6,904,229 B1 * 6/2005 Suzuki et al. ................. 386/95

* cited by examiner

*Primary Examiner*—Donald Sparks
*Assistant Examiner*—Hashem Farrokh
(74) *Attorney, Agent, or Firm*—Gerald T. Bodner

(57) ABSTRACT

A content recording apparatus that writes, when a recording instruction is issued, into a first area of a recording medium predetermined information indicating a predetermined value, records into a plurality of partial areas sporadically distributing in a second area of the recording medium a content to which a plurality of markers are assigned in a predetermined manner, and after completing recording the content, writes into a third area of the recording medium link information indicative of a link state among partial areas in which the content is recorded, and updates a value indicated by the predetermined information written in the first area, includes: a predetermined information detector for detecting the latest predetermined information out of the predetermined information written in the first area when a driving power is input; an area detector for detecting from the second area partial areas in a non-link state based on the link information written in the third area when the predetermined information detected by the predetermined information detector indicates the predetermined value; an information creator for creating link information indicative of a link state among the partial areas detected by the area detector; a marker detector for detecting the markers from the partial areas detected by the area detector; and a writing/updating processor for writing into the third area partial link information based on a detection result of the marker detector out of the link information created by the information creator, and updating a value indicated by the predetermined information detected by the predetermined information detector.

17 Claims, 18 Drawing Sheets

| |
|---|
| LOCATION INFO. OF SOUND DATA 0 |
| SIZE INFO. OF SOUND DATA 0 |
| LOCATION INFO. OF JPEG DATA 0 |
| SIZE INFO. OF JPEG DATA 0 |
| LOCATION INFO. OF JPEG DATA 1 |
| SIZE INFO. OF JPEG DATA 1 |
| LOCATION INFO. OF JPEG DATA 2 |
| SIZE INFO. OF JPEG DATA 2 |
| LOCATION INFO. OF SOUND DATA 1 |
| SIZE INFO. OF SOUND DATA 1 |
| LOCATION INFO. OF JPEG DATA 3 |
| SIZE INFO. OF JPEG DATA 3 |
| LOCATION INFO. OF JPEG DATA 4 |
| SIZE INFO. OF JPEG DATA 4 |
| LOCATION INFO. OF JPEG DATA 5 |
| SIZE INFO. OF JPEG DATA 5 |
| ⋮ |
| LOCATION INFO. OF JPEG DATA n-1 |
| SIZE INFO. OF JPEG DATA n-1 |
| LOCATION INFO. OF JPEG DATA n |
| SIZE INFO. OF JPEG DATA n |
| |

| LIST NO. | COMMAND | PARAMETER 1 | PARAMETER 2 | PARAMETER 3 |
|---|---|---|---|---|
| 0 | | | | |
| 1 | | | | |
| 2 | | | | |
| 3 | | | | |
| ⋮ | ⋮ | ⋮ | ⋮ | ⋮ |
| L-1 | | | | |
| L | | | | |

46b

|  | HEAD ADDRESS | VACANT SIZE |
|---|---|---|
| ① | 48 | 503 |
| ② | 96 | 268 |
| ③ | 71 | 245 |
| ④ | 3 | 32 |
|  |  |  |
|  |  |  |
|  |  |  |

46c

| i | FRAME | | SOUND | |
|---|---|---|---|---|
| | LOCATION INFO. | SIZE INFO. | LOCATION INFO. | SIZE INFO. |
| 0 | | | | |
| 1 | | | | |
| 2 | | | | |
| 3 | | | | |
| 4 | | | | |
| 5 | | | | |
| ⋮ | ⋮ | ⋮ | ⋮ | ⋮ |

CONTENT RECORDING APPARATUS

TECHNICAL FIELD

The present invention relates to a data recording apparatus. More specifically, the present invention relates to a data recording apparatus that is adopted to a digital camera, records, when a recording instruction of a data signal is applied, predetermined information into a first area of a recording medium, records into a second area of the recording medium the data signal having a plurality of markers assigned in a predetermined manner, writes into a third area of the recording medium recording location information of the data signal after completing recording the data signal, and rewrites the predetermined information.

PRIOR ART

As to a method of recording a data signal into a recording medium, an FAT (File Allocation Table) system of an MS-DOS format is well known. In the FAT system, the data signal to be recorded is handled in a cluster unit so that even when a vacant area is sporadically distributed as a result of repeated recordings and deletions, it is possible to record the data signal without problem as long as a total of the vacant area exceeds a size of the data signal.

However, in the FAT system, since a directory entry and FAT information (link information) are updated after completing recording the data signal, the recorded data signal becomes invalidated if a power source is cut-off when recording the data signal is under progress. That is, it becomes impossible to reproduce the recorded data signal, and in addition, the recorded data signal is overwritten by a succeeding recording process.

SUMMARY OF THE INVENTION

Therefore, it is a primary object of the present invention to provide a novel data recording apparatus.

It is another object of the present invention to provide a data recording apparatus capable of validating a recorded data signal even in a case that a power is cut-off when a recording is under progress.

According to the present invention, a content recording apparatus that writes, when a recording instruction is issued, into a first area of a recording medium predetermined information indicating a predetermined value, records into a plurality of partial areas sporadically distributing in a second area of the recording medium a content to which a plurality of markers are assigned in a predetermined manner, and after completing recording the content writes into a third area of the recording medium link information indicative of a link state among partial areas in which the content is recorded, and updates a value indicated by the predetermined information written in the first area, comprises: a predetermined information detector for detecting the latest predetermined information out of the predetermined information written in the first area when a driving power is input; an area detector for detecting from the second area partial areas in a non-link state based on the link information written in the third area when the predetermined information detected by the predetermined information detector indicates the predetermined value; an information creator for creating link information indicative of a link state among the partial areas detected by the area detector; a marker detector for detecting the markers from the partial areas detected by the area detector; and a writing/updating processor for writing into the third area partial link information based on a detection result of the marker detector out of the link information created by the information creator, and updating a value indicated by the predetermined information detected by the predetermined information detector.

When a recording instruction is issued, predetermined information indicating a predetermined value is written into a first area of a recording medium, and a content having a plurality of markers assigned in a predetermined maimer is recorded into a second area of the recording medium. Upon completion of recording the content, recording location information of the content is written into a third area of the recording medium, and a value indicated by the predetermined information is updated. Herein, the predetermined information written in the first area is detected by a predetermined information detector when a driving power is input. When the detected predetermined information shows the predetermined value, a plurality of markers corresponding to the predetermined information are detected from the second area by a marker detector. A creator creates the recording location information based on a detection result of the marker detector; and a writing/updating processor writes into the third area created recording location information, and updates a value indicated by the predetermined information detected by the predetermined information detector.

When the predetermined information has the predetermined value, the recording location information is to be created based on a plurality of the markers corresponding to the predetermined information so that the recorded content can be validated even in a case that the driving power is cut-off when the recording is under progress.

When the predetermined information is size information of the content, the predetermined value indicates zero, and the marker detector carries out a marker detection when the size information indicates zero.

In a case of fetching the content by a fetcher, a first process, which is to write a fetched content into a buffer memory, and a second process, which is to record the content stored in the buffer memory into the second area of the recording medium, are executed in parallel with each other by a processor.

In a case of fetching a commercially-used power by a plug, the fetched commercially-used power is converted into a driving power by a converter.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 3 is an illustrative view showing another example of the mapping state of the SDRAM;

FIG. 4 is an illustrative view showing structure of an instruction list;

BEST MODE FOR PRACTICING THE INVENTION

Figure 1:
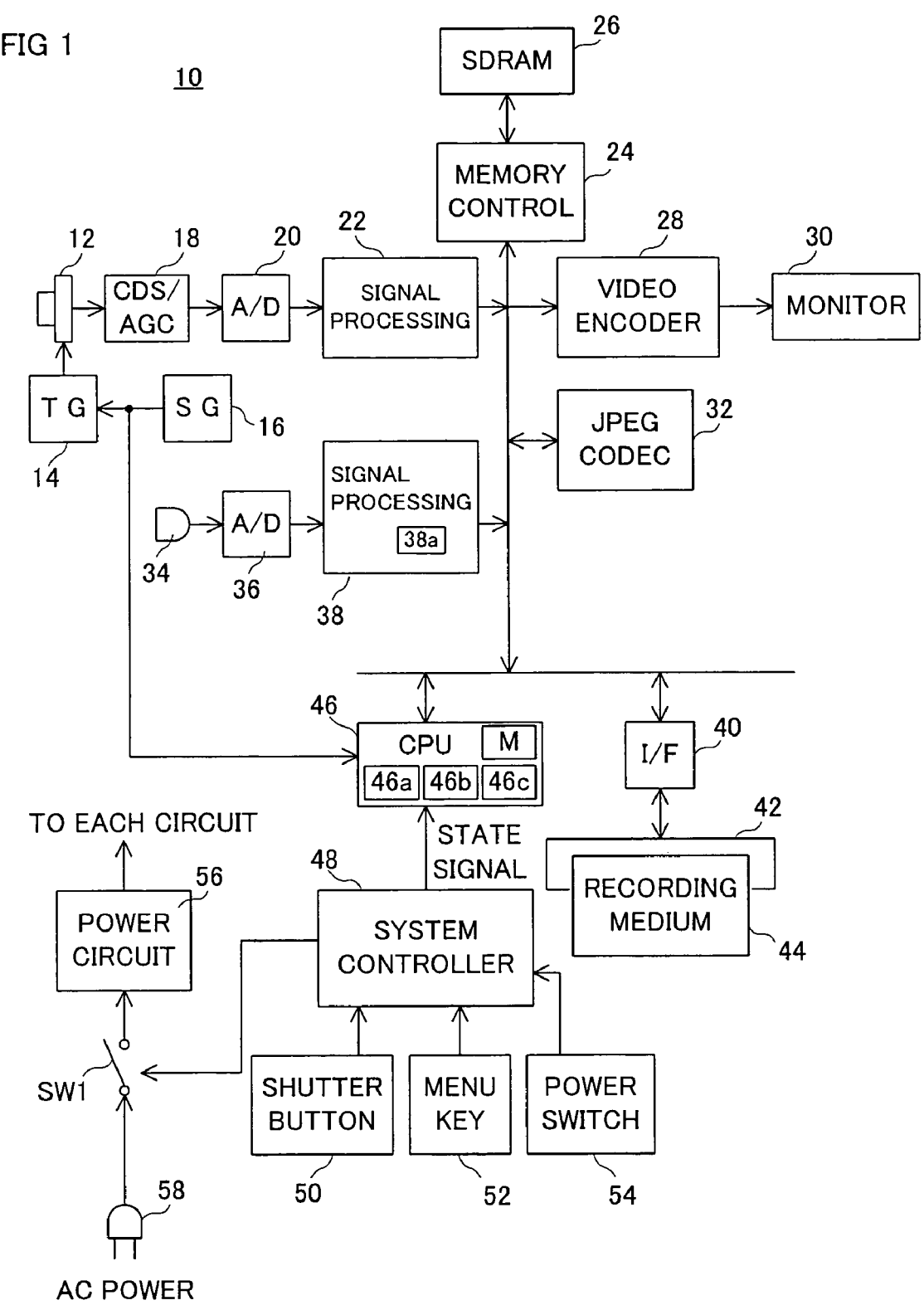
FIG. 1 is a block diagram showing one embodiment of the present invention.

Referring to FIG. 1, a digital camera 10 of this embodiment includes an image sensor 12. At a front surface of the image sensor 12, a color filter (not shown) is attached, and an optical image of an object is radiated onto the image sensor 12 via the color filter.

When a power switch 54 is input, a switch SW1 is turned-on by a system controller 48. A power circuit 56 converts an AC power (commercially-used power source) supplied via a power plug 58 into a DC power (driving power), and supplies a converted DC power to a whole system.

Figures 5, 6:
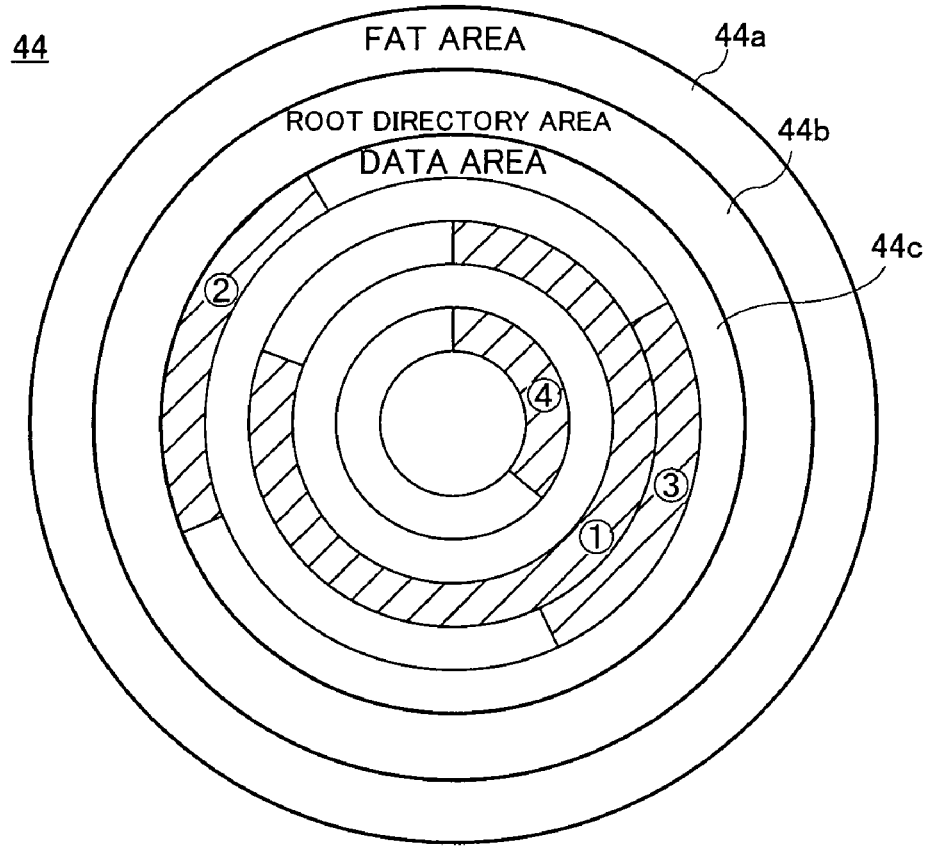
FIG. 5 is an illustrative view showing one example of structure of a recording medium.
FIG. 6 is an illustrative view showing one example of structure of a vacant area table.

A CPU 46 started by the DC power reads out a file name stored in a non-volatile memory M, and searches the same file name as the read file name from a directory entry of a recording medium 44. The recording medium 44 is a detachable recording medium formatted according to an MS-DOS, and formed with an FAT area 44a, a root directory area 44b, and a data area 44c on a recording surface as shown in FIG. 5. The file name is searched from the root directory area 44b. If the same file name is found, size information assigned to the file name that is found is detected, and a value indicated by the detected file information is determined. When the file information shows the value other than "0", a photographing process is started, and when the file information shows "0", a recovery process is started.

That is, according to the MS-DOS, the file name and the size information showing that the size is 0 are written into the directory entry when a file is created, and when a data writing to the created file is completed, a total size of the file is detected, and in addition, the size information of the directory entry is updated by the detected total size. This leads to assuming that in spite of a fact that the same file name as the file name stored in the non-volatile memory M exists in the directory entry, if the size information assigned to this file name shows "0", this file is in an inappropriate state.

In this embodiment, unless such an inappropriate file exists, a normal photographing process is carried out. However, if the inappropriate file exists, the recovery process, which is to recover the inappropriate file to an appropriate state, is carried out. It is noted that the file name stored in the non-volatile memory M is a file name of the file created by a last photographing process (latest file). Furthermore, when the size information detected from the directory entry shows "0", firstly, a message that says "recover file? YES NO" is displayed on a monitor 30, and if YES is herein selected, the process moves to the recovery process.

Firstly, the photographing process will be described. In the photographing process, an operator can select a desired photographing mode from a plurality of photographing modes by operating a menu key 52. Any one of a resolution and a frame rate as to a photographed image, and an acoustic system, a bit rate and a sampling rate as to a fetched sound is different depending on the photographing mode. If the desired photographing mode is selected, a corresponding information signal is applied from a system controller 48 to the CPU 46. The CPU 46 stores, together with the file name of a movie file to be created, photographing mode information showing the selected photographing mode (resolution, frame rate, acoustic system, bit rate, and sampling rate) into the non-volatile memory M.

Also, the CPU 46 instructs a timing generator (TG) 14 to photograph by the resolution and the frame rate shown by the photographing mode information. The TG 14 generates a timing signal according to the desired photographing mode (resolution, frame rate) based on a vertical synchronizing signal and a horizontal synchronizing signal output from a signal generator (SG) 16, and drives the image sensor 12 according to a luster scan system. A camera signal (electric charge) having a desired resolution is output from the image sensor 12 at a desired frame rate, and the output camera signal is input into a signal processing circuit 22 as camera data, which is a digital signal, via a CDS/AGC circuit 18 and an A/D converter 20.

The signal processing circuit 22 applies the input camera data to a YUV conversion so as to generate YUV data, and stores generated YUV data into an SDRAM 26 through a memory control circuit 24. On the other hand, a video encoder 28 reads out the YUV data from the SDRAM 26 through the memory control circuit 24, and encodes the read YUV data into a composite image signal. The encoded composite image signal is applied to the monitor 30. As a result, a real time moving image (through image) of the object is displayed on the monitor 30.

The CPU 46 is installed with a real time OS, and a generating process of the movie file to the recording medium 44 and a data writing to the generated move file are carried out by a BG (Back Ground) process, which is in parallel with the photographing process. At this time, an instruction list 46a as shown in FIG. 4 is created in order that a process between the photographing process and the BG process are smoothly carried out.

When a shutter button 50 is depressed by the operator, and a corresponding state signal is applied from the system controller 48, the CPU 46 sets to the instruction list 46a commands and parameters corresponding to "Start BG process", "Create file", "Create table", and "Open file", respectively. Firstly, the BG process is started by "Start BG process", and the file name of the movie file and the size information showing "0" are written by "Create file" into a root directory area 44*b* shown in FIG. 5. In "Create table", a vacant area table 46*b* as shown in FIG. 6 is created. According to FIG. 6, a head address and a vacant size of the respective vacant areas formed in the data area 44*c* are set in order of magnitude in size. In "Open file", the handle number for specifying the movie file in which the data is written is created.

Thus, upon completion of preparing the data writing, the CPU 46 carries out a fetching process of a thumbnail image and a creating process of header information during a next 1-frame period for creating a movie file header. Firstly, a thinning-out process is instructed to the signal processing circuit 22, and a compression process is instructed to a JPEG CODEC 32. The signal processing circuit 22 carries out the thinning-out process in addition to the above-described YUV conversion, and writes thumbnail YUV data thereby created into the SDRAM 26 through the memory control circuit 24. The JPEG CODEC 32 reads out the thumbnail YUV data from the SDRAM 26 so as to apply a JPEG compression, and writes a JPEG raw data SUM thereby created into the SDRAM 26 through the memory control circuit 24.

Figure 2:
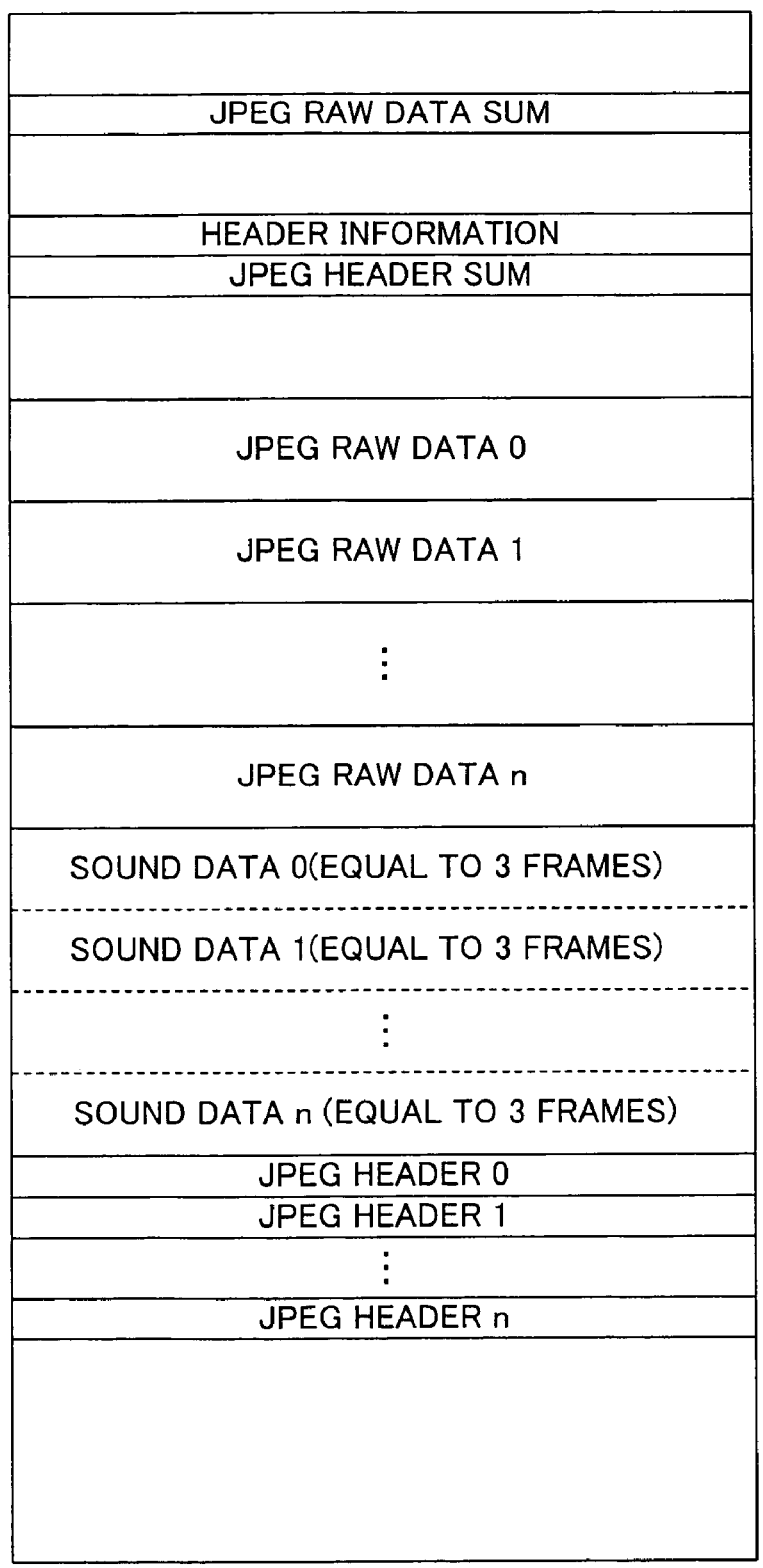
FIG. 2 is an illustrative view showing one example of a mapping state of an SDRAM.

In addition, the CPU 46 creates on its own a JPEG header SUM, which is a header of the JPEG raw data SUM, and writes the created JPEG header SUM into the SDRAM 26 through the memory control circuit 24. Furthermore, the CPU 46 creates on its own the header information including the above-described photographing mode information, and writes the created header information in the SDRAM 26. Thereby, the JPEG raw data SUM, the JPEG header SUM, and the header information are mapped into the SDRAM 26 as shown in FIG. 2.

Figure 7:
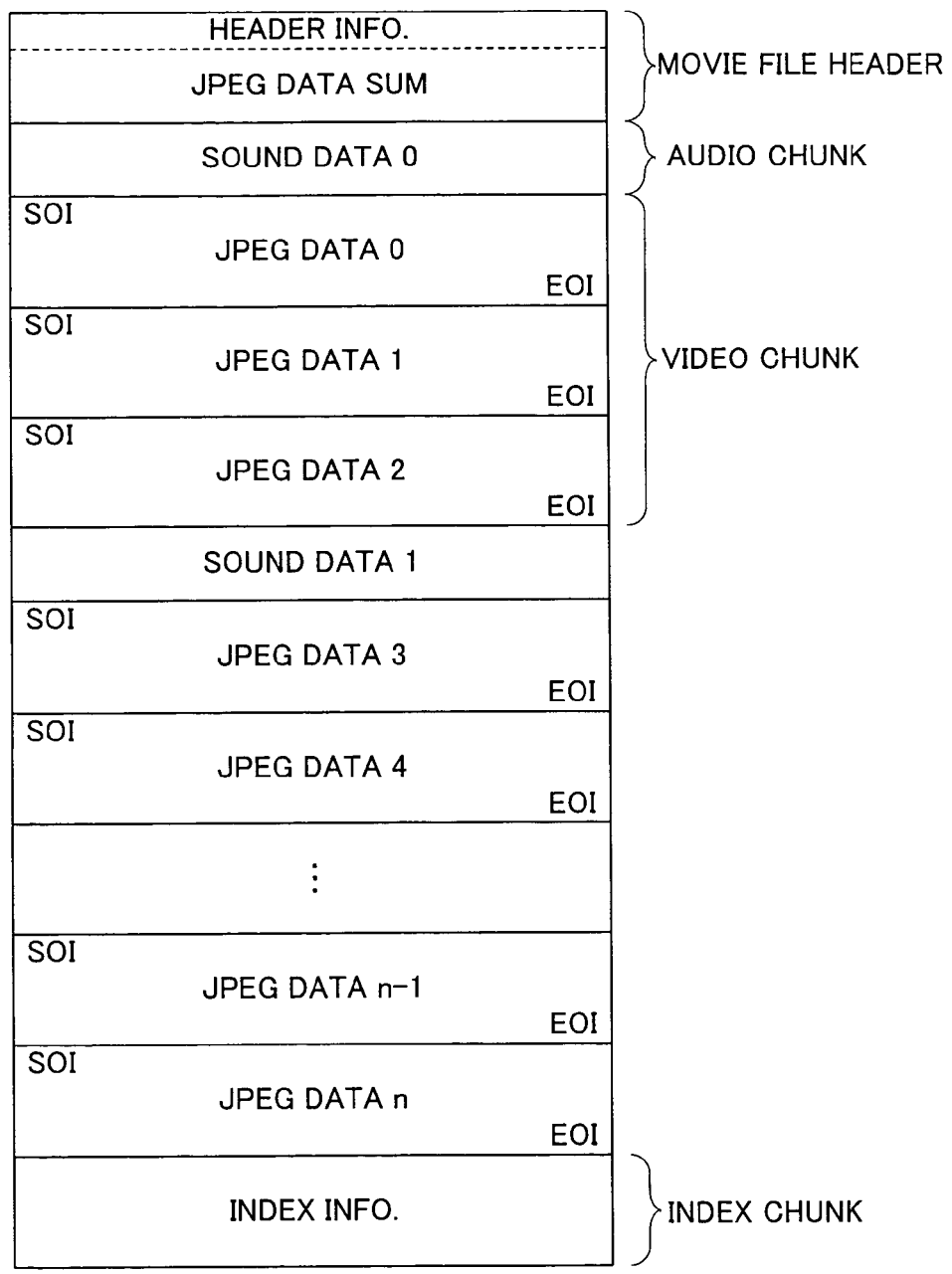
FIG. 7 is an illustrative view showing structure of a movie file in a completed state.

In the instruction list 46*a*, "Write file" is set so as to write into the recording medium 44 the JPEG raw data SUM, the JPEG header SUM, and the header information. As a result of this "Write file" being executed by the BG process, the movie file header shown in FIG. 7 is created in the data area 44*c* shown in FIG. 5. It is noted that the JPEG data SUM shown in FIG. 7 is formed of the JPEG header SUM, and the JPEG raw data SUM.

Upon completion of creating the movie file header, the CPU 46 carries out an image fetching process and a sound fetching process at every time that the vertical synchronizing signal is issued. In the image fetching process, the JPEG header created by its own is written into the SDRAM 26 through the memory control circuit 24, and the compression instruction is applied to the JPEG CODEC 32. The JPEG CODEC 32, when the compression instruction is applied, reads out the YUV data of a current frame from the SDRAM 26 through the memory control circuit 24, and applies the compression process to the read YUV data. When the JPEG raw data is generated by the compression process, the JPEG raw data is written into the SDRAM 26 through the memory control circuit 24.

In the sound fetching process, the process instruction is applied to the signal processing circuit 38. The signal processing circuit 38, when the process instruction is applied, writes into the SDRAM 26 through a memory control circuit 38*a* the sound data, which is equal to one frame, accumulated in an SRAM 38*a*. As a result of such the image fetching process and the sound fetching process being carried out by every one frame period, the JPEG header, the JPEG raw data, and the sound data of the respective frames are mapped in the SDRAM 26 as shown in FIG. 2.

It is noted that in FIG. 2, the serial numbers are attached to the JPEG header and the JPEG raw data by each one frame, however, the serial numbers are attached to the sound data by each three frames. In addition, the JPEG data worth one frame is formed by the JPEG header and the JPEG raw data to which the same number is attached, and markers SOI (Start of Image) and EOI (End of Image) are assigned to a head and an end of the JPEG data of the respective frames as shown in FIG. 7.

The CPU 46 sets "Write file" to the instruction list 46*a* by each 3-frame period so that the sound data equal to three frames, and the JPEG equal to three frames are written into the recording medium 44. As a result of this "Write file" being executed by the BG process, an audio chunk formed of the sound data equal to three frames, and a video chunk formed of three frames of the JPEG data are recorded in a data area 44*c* of the recording medium 44. As shown in FIG. 7, the audio chunk and the video chunk are mapped one after the other on the movie file.

Also, the CPU 46 creates index information of the JPEG data and the sound data at every time that the 3-frame period has passed. The index information of the JPEG data is formed of the data size of the respective frames and a distance from the head of the movie file when written into the recording medium 44, and the index information of the sound data is formed of the data size equal to three frames, and a distance from the head of the movie file when written into the recording medium 44. Such the index information is, firstly, stored in the SDRAM 26 as shown in FIG. 3. According to FIG. 3, location information and size information of the sound data equal to three frames, and the location information and the size information of the JPEG data worth three frames are mapped one after the other in the SDRAM 26.

When the shutter button 50 is depressed once again, the CPU 46 cancels the image fetching and the sound fetching, and sets "Write file" to the instruction list 46*a* for writing the index information shown in FIG. 3. As a result of this "Write file" being executed by the BG process, the index chunk shown in FIG. 7 is formed at the end of the movie file. Upon completion of creating the index chunk, the CPU 46 calculates a total size value of the movie file created this time, and sets "Write file" to the instruction list 46*a* for writing the calculated total size value to the movie file header. As a result of this file writing being executed by the BG process, the total size value is added to the header information of the movie file header. This completes a creation of the movie file that satisfies a QuickTime format.

Next, the CPU 46 sets "Close file" and "End BG process" to the instruction list 46*a*. If "Close file" is executed by the BG process, the size information written in the root directory area 44*b* and FAT information written in the FAT area 44*a* are updated. More specifically, the file name of the movie file created this time is detected from the directory entry, and the size information assigned to the detected file name is updated from "0" to the total size value. In addition, the FAT information is updated in such a manner that a link is formed in a writing area (cluster) for the movie file created this time. The BG process is ended by "End BG process".

Figure 8:
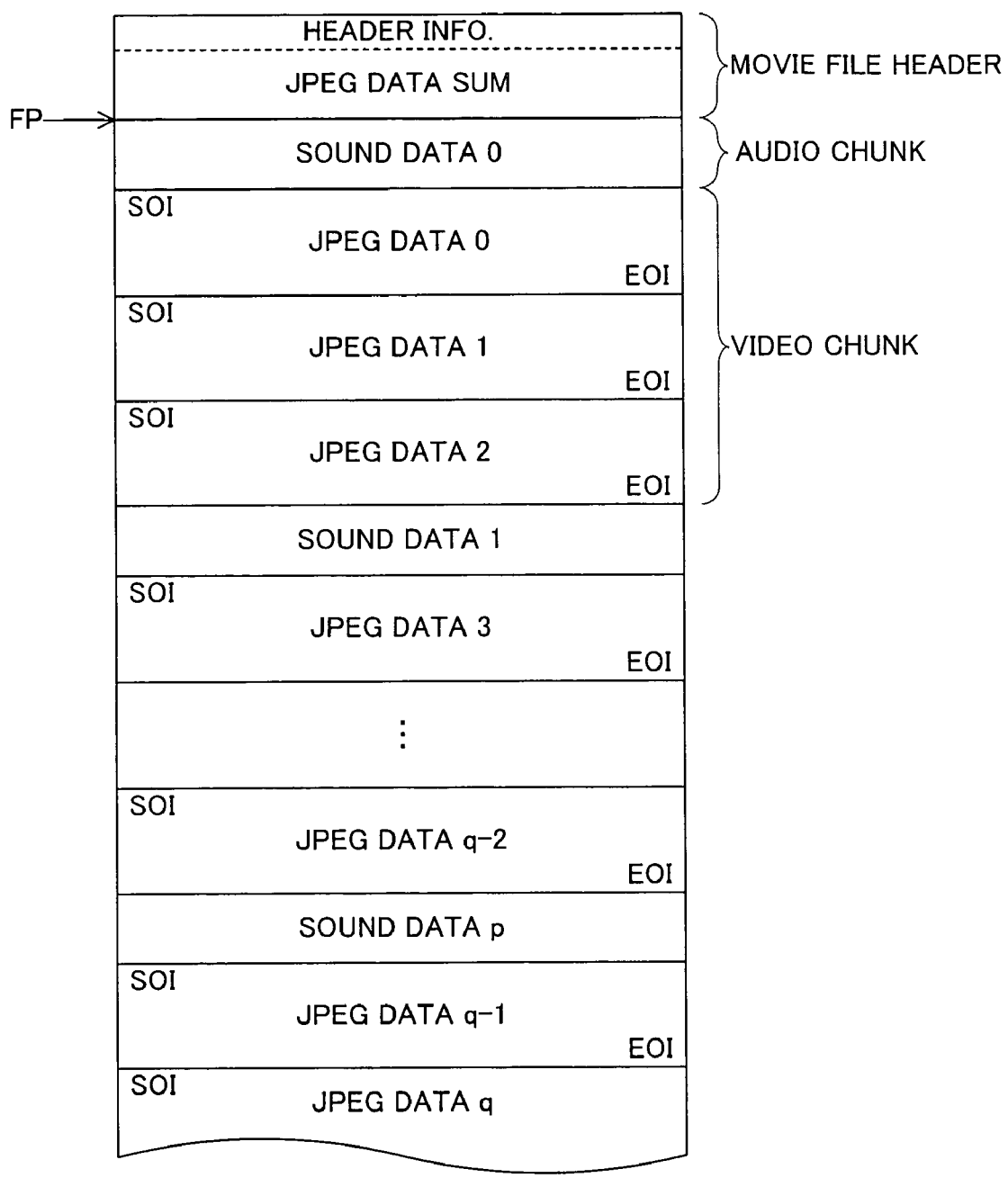
FIG. 8 is an illustrative view showing structure of the movie file in an incomplete state.

If the driving power is accidentally cut-off, that is, the power plug 58 is pulled off from an electric outlet, for example, when the movie file is being created, the creation of the movie file is ended without updating the size information and the FAT information. The latest movie file remains in the recording medium 44 in an incomplete state as shown in FIG. 8. In such the case, the size information assigned to the same file name as the file name stored in the non-volatile memory M shows "0" on the directory entry, and the recovery process is carried out at a time of inputting the power at a next time. It is noted that in the recovery process, the instruction is not set to the instruction list 46a, and the BG process is not to be carried out, either.

At a time of the recovery process, the CPU 46 firstly reads out the photographing mode information and the file name from the non-volatile memory M, and creates the vacant area table 46b shown in FIG. 6 by referring to the FAT information. Also in the recovery process, the head address and the vacant size in the respective vacant areas are listed in order of magnitude in size of the vacant area. No link is created in an incomplete movie file, and in the vacant areas listed in the vacant area table 46b, the incomplete movie file is written in reality. Thus, the CPU 46 updates the FAT information in such a manner that the link is formed in the respective vacant areas set in the vacant area table 46a. This results in the link being formed, orderly from the file head, in the respective clusters in which the incomplete movie file is written. It is noted that at this time, the link is formed even for the data not related to the incomplete movie file (inappropriate data).

Next, the CPU 46 opens the incomplete movie file (creates the handle number), and reads out header portion data of the incomplete movie file to the SDRAM 26. Since the movie file header is included in the read head portion data, the CPU 46 specifies the head address of the first audio chunk from this data, and sets a file pointer FP to the corresponding address on the movie file. The file pointer FP is set on the movie file as shown in FIG. 8.

Figures 9, 10:
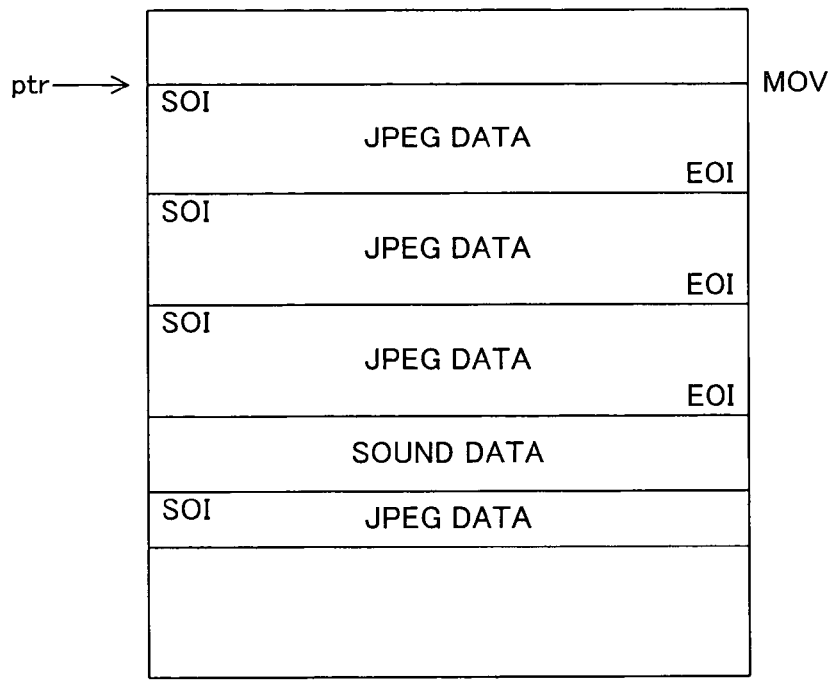
FIG. 9 is an illustrative view showing another example of the mapping state of the SDRAM.
FIG. 10 is an illustrative view showing structure of an index information table.
Figure 11:
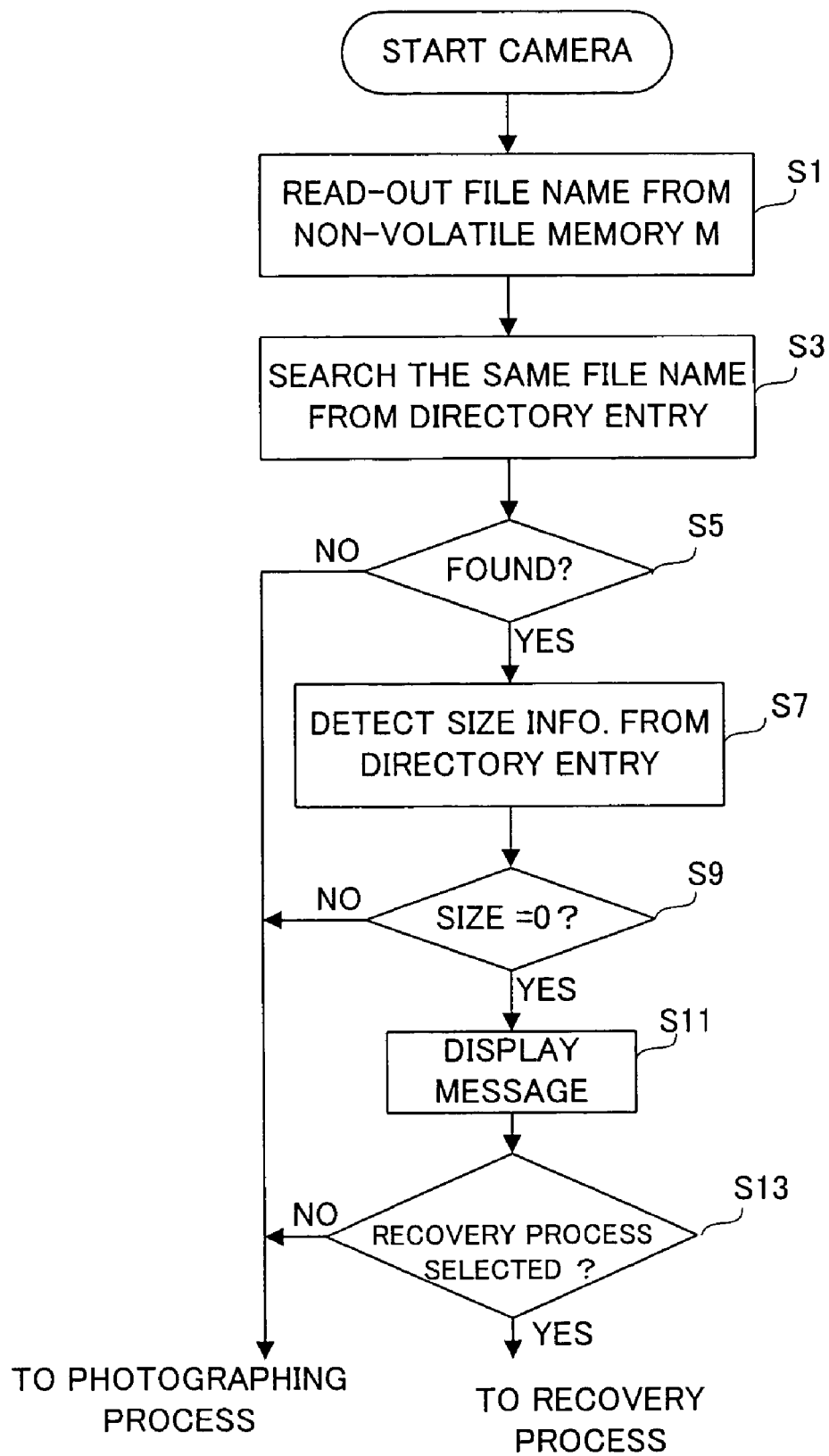
FIG. 11 is a flowchart showing one portion of a CPU operation at a time of starting a camera.
Figure 12:
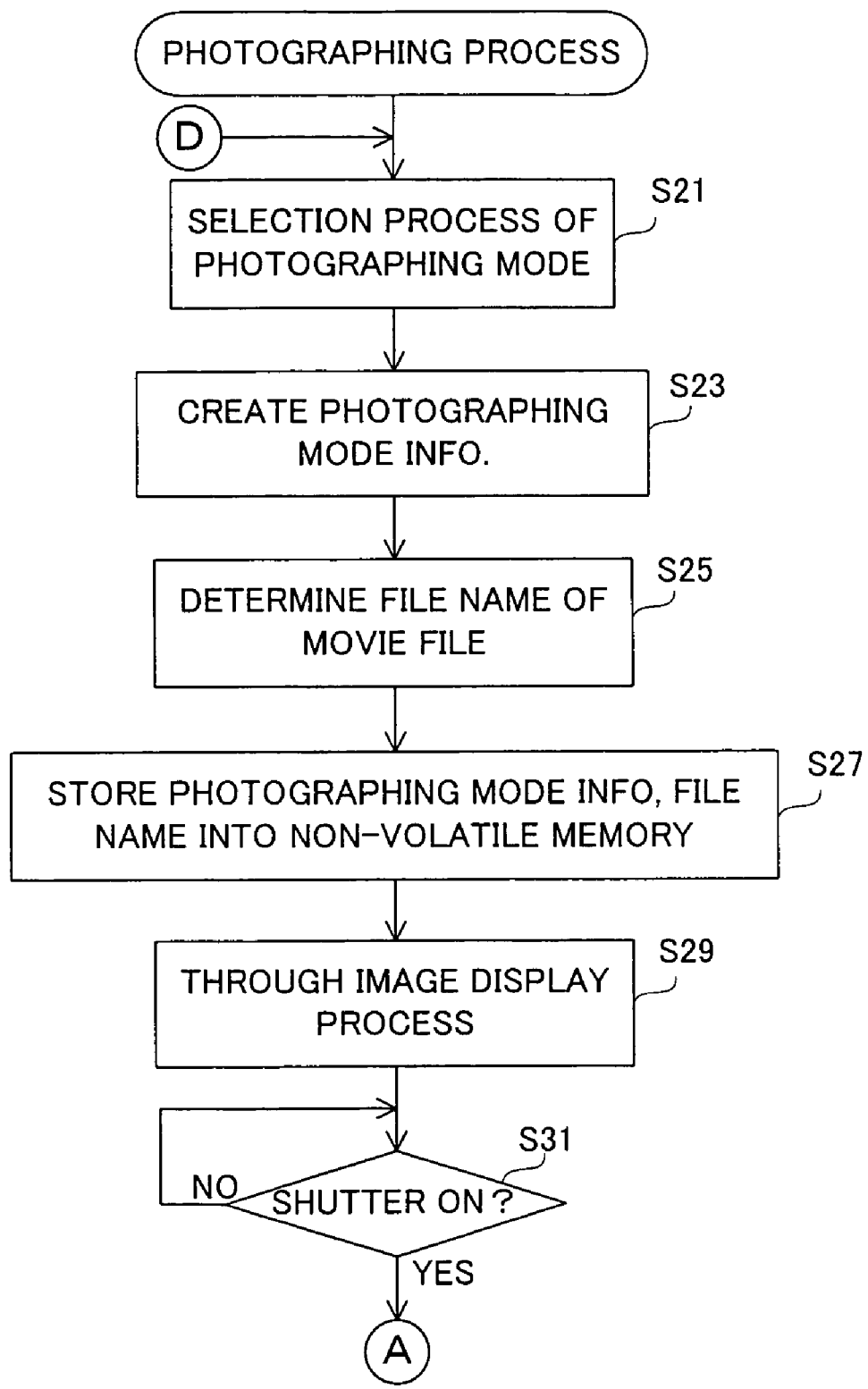
FIG. 12 is a flowchart showing one portion of the CPU operation when a photographing process is carried out.
Figure 13:
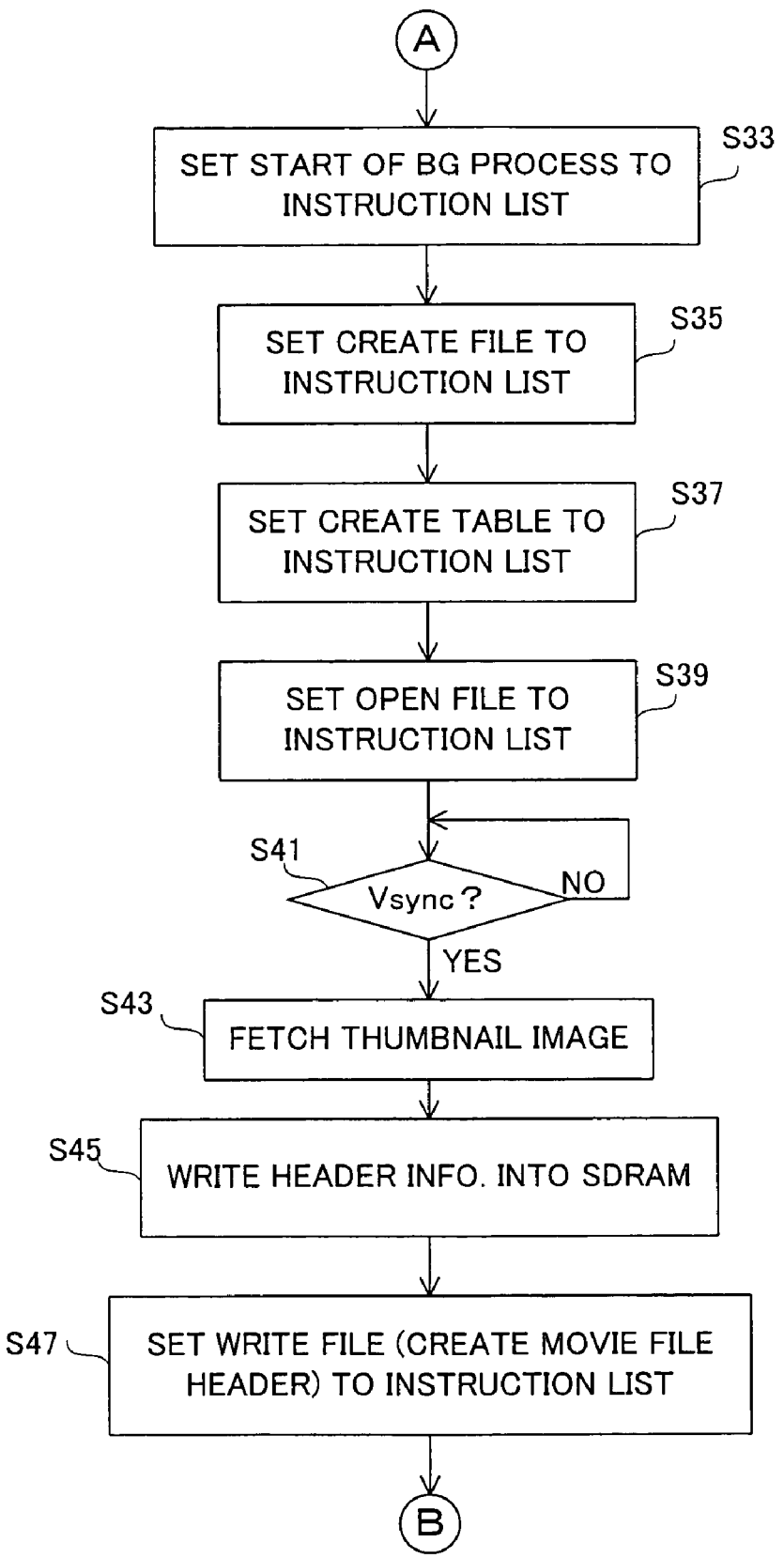
FIG. 13 is a flowchart showing another portion of the CPU operation when the photographing process is carried out.
Figure 14:
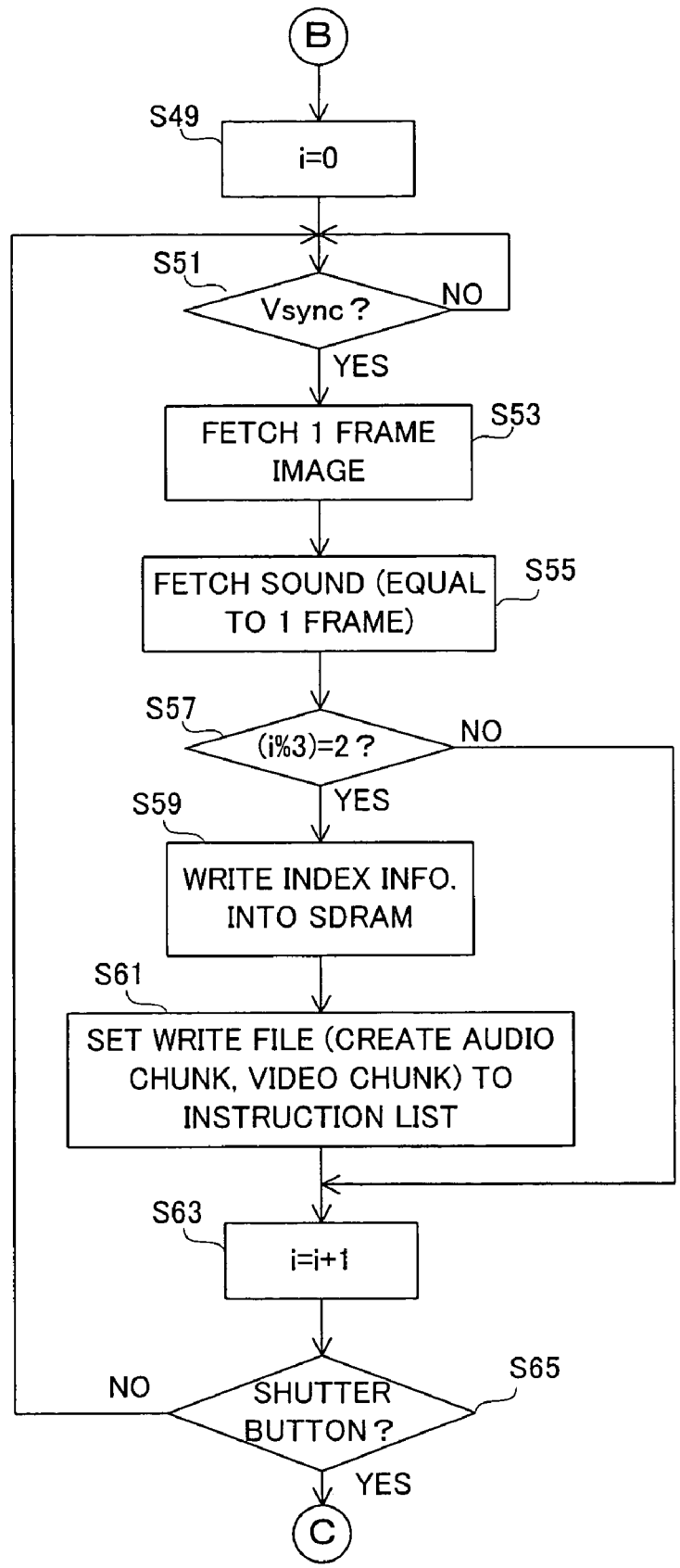
FIG. 14 is a flowchart showing the other portion of the CPU operation when the photographing process is carried out.
Figure 15:
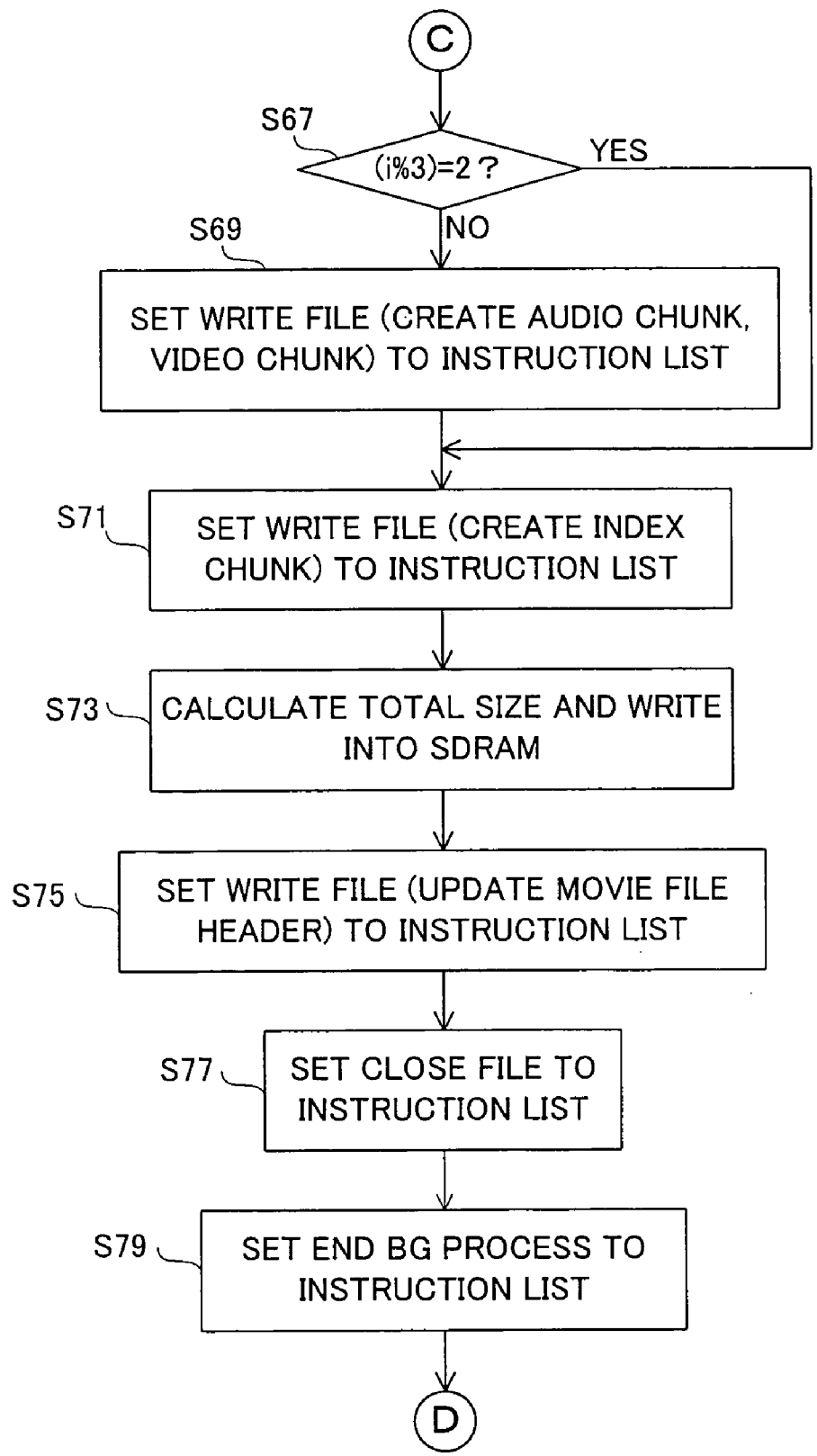
FIG. 15 is a flowchart showing a further portion of the CPU operation when the photographing process is carried out.

Also, the CPU 46 calculates a size of one audio chunk based on the acoustic system, the bit rate, and the sampling rate of the sound data included in the photographing mode information advances the file pointer FP by the calculated size, and reads out the data worth four frames subsequent to the present address of the file pointer FP. The size worth one frame is calculated based on the resolution of the image data included in the photographing mode information, and the read data is stored in the SDRAM 26. Thereby, the JPEG data worth three frames forming the first video chunk, the sound data equal to three frames forming the second audio chunk, and a portion of the JPEG data forming the second video chunk are mapped in the SDRAM 26 as shown in FIG. 9.

At the head and the end of the JPEG data of the respective frames, the markers SOI and EOI are written. Herein, the marker SOI is described "ffd8" by using 16 bits, and the marker EOI is described "ffd9" using 16 bits. However, since each address of the SDRAM 26 is 8 bits, "ffd8" and "ffd9" are described using two addresses. That is, "ff" and "d8" are written to the head two addresses of the JPEG data of the respective frames, and "ff" and "d9" are written to the last two addresses. The CPU 46 reads out the data value by each one address regarding the data worth four frames stored in the SDRAM 26, considers that the marker SOI is written if "d8" is present subsequent to "ff", and considers that the marker EOI is written if "d9" is present subsequent to "ff".

When the markers SOI and EOI are detected one after the other by each three by such the determination process, it is determined that the JPEG data worth three frames forming the movie file is present in the SDRAM 26. At this time, the index information is created regarding this JPEG data worth three frames, and the sound data equal to three frames prior thereto, and writes the created index information into an index information table 46c shown in FIG. 10. Thereafter, the file pointer FP is advanced to the head address of a subsequent video chunk, the data worth four frames is read-out from the head address onward of the subsequent video chunk, and the same marker detection as that described above is carried out regarding the read data.

In a case that the marker SOI is not detected from the head of the data worth four frames written in the SDRAM 26, a case that the marker SOI or EOI is detected for two times consecutively or a case that although the marker SOI is detected from the head of the data worth of four frames, any single marker EOI is detected thereafter, it is determined that the inappropriate data not forming the movie file is included in the data worth four frames. At this time, the index information is read-out from the index information table 46c, and the index chunk formed of the read index information is created subsequent to the address to which the file pointer FP currently points. As a result, all data worth four frames written in the SDRAM 26 are invalidated.

Upon completion of creating the index chunk, the CPU 46 calculates the total size value of the validated incomplete movie file, and adds the calculated total size value to the header information of the movie file header. In addition, the CPU 46 updates, from "0" to this total movie size value, the size information assigned to the file name of the incomplete movie file in the directory entry. Furthermore, the CPU 46 updates the FAT information in order to invalidate the link in the area (cluster) in which the inappropriate data is written subsequent to the index chunk. Upon completion of updating the FAT information, the recovery process is ended.

The CPU 46, more specifically, processes flowcharts shown in FIG. 11–FIG. 20. Firstly, the file name is read-out from the non-volatile memory M in a step S1 in FIG. 11, and the same file name is searched from the root directory area 44a shown in FIG. 5 in a step S3. If the same file name is not found, NO is determined in a step S5, and the process directly moves to a photographing process shown in FIG. 12. On the other hand, if the same file name is found, the process advances from the step S5 to a step S7 so as to detect the size information assigned to the file name that is found from the directory entry. In a step S9, it is determined whether or not the detected size information shows "0", and if the size information is other than "0", the process directly moves to the photographing process in FIG. 12. In contrary, if the size information shows "0", the process advances to a step S11 so as to display a message that asks "recover movie file? YES NO" on the monitor 30. If "NO" is selected by a key operation, NO is determined in a step S13, and the process moves to the photographing process shown in FIG. 12. However, if "YES" is selected, YES is determined in the step S13, and the process moves to the recovery process shown in FIG. 17.

When the process moves to the photographing process, a photographing mode selection process is carried out in a step S21. More specifically, a menu showing a plurality of the photographing modes is displayed on the monitor 30, and the desired photographing mode is determined in response to an operation of the menu key 52. Once the photographing mode is determined, the process advances to a step S23 so as to create the photographing mode information showing the selected photographing mode. Setting information may include "resolution: GVGA", "frame rate: 30 fps", "acoustic system: stereo", "bit rate: 8 bits", "sampling rate: 8 KHz", for example.

In a step S25, the file name of the movie file to be created by the current photographing process is determined. If NO is determined in the step S5 or S13, the file name read-out from the non-volatile memory M is used as it is. However, if NO is determined in the step S9, the file name that adds "1" to the file number of the file name found from the directory entry is determined. If the file name to be found is "VCLIP0002.MOV", for example, "VCLIP0003.MOV" will be the file name this time. When the photographing mode information and the file name are thus created/determined, the photographing mode information and the file name are stored in the non-volatile memory M in a step S27.

In a step S29, the process instruction is applied to the TG 14, the signal processing circuit 22, and the video encoder 28, respectively, so as to carry out a through image display. A through image of the object is displayed on the monitor 30. If the shutter button 50 is depressed by the operator with the through image being displayed, "Start BG process", "Create file", "Create table", and "Open file" are set to list numbers "0"–"3" of the instruction list 46a shown in FIG. 4 in each of steps S33–S39.

TABLE 1

| Kinds | Command | Parameter 1 | Parameter 2 | Parameter 3 |
|---|---|---|---|---|
| Start BG process | FILE_STRT | — | — | — |
| Create file | FILE_CREATE | Drive number | File pass | — |
| Create table | FILE_SET_ALLOC | Drive number | — | — |
| Open file | FILE_OPEN | Drive number | File pass | — |
| Write file | FILE_WRITE | Handle number | SDRAM address | Size (byte) |
| Close file | FILE_CLOSE | — | — | — |
| End BG process | FILE_END | — | — | — |

Referring to Table 1, FILE_START is set as a command as to "Start BG process", and FILE_CREATE, a drive number (the number of a drive that drives the recording medium 44), and a file pass are set as a command, parameters 1, and 2 as to "Create file". In addition, FILE_SET_ALLOC and the drive number are set as the command and the parameter 1 as to "Create table", and FILE_OPEN, the drive number, and the file pass are set as the command, the parameters 1, and 2 as to "Open file". The file name and the size information determined in the step S25 are included in the file pass set as to "Create file", and the file name and the size information are written into the directory entry. However, since the movie file is incomplete, the size information indicates "0".

When the vertical synchronizing signal is output from the SG 16 upon completion of the process in the step S39, YES is determined in a step S41, and a fetching process of a thumbnail image is carried out in a step S43. More specifically, the JPEG header SUM created on its own is written into the SDRAM 26, and the thinning-out process and the compression process are instructed to the signal processing circuit 22 and the JPEG CODEC 32, respectively. The signal processing circuit 22 carries out the thinning-out process of the YUV data in a 1-frame period, and thumbnail YUV data thereby created is written into the SDRAM 26. The JPEG CODEC 32 reads out the thumbnail YUV data from the SDRAM 26, applies the compression process thereto, and writes the JPEG raw data SUM into the SDRAM 26. The JPEG header SUM and the JPEG raw data SUM are mapped in the SDRAM 26 as shown in FIG. 2. In a succeeding step S45, the header information including the above-described photographing mode information (resolution, frame rate, acoustic system, bit rate, sampling rate) are created, and this header information is written into the SDRAM 26. The header information is mapped on the JPEG header SUM as shown in FIG. 2.

When the header information, the JPEG header SUM, and the JPEG raw data SUM that form the movie file header are thus stored into the SDRAM 26, "Write file" is set to columns of the list number "4" and "5" of the instruction list 46a shown in FIG. 4 in a step S47. As understood from Table 1, FILE_WRITE, the handle number (acquired by a file open process), an SDRAM address, and the data size are set as the command, the parameters 1, 2, and 3 as to "Write file". A reason why 2 of "Write file" are set is that although the header information and the JPEG header SUM are successive on the SDRAM 26, the JPEG raw data SUM is stored in a distant location.

In the column of the list number "4", a starting address of the header information is set as the SDRAM address, and a total size of the header information and the JPEG header SUM are set as the data size. Furthermore, in the column of the list number "5", the starting address and the size of the JPEG raw data SUM are set as the SDRAM address and the data size. As a result, the header information, the JPEG header SUM, and the JPEG raw data SUM are to be aligned successively in this order on the movie file header shown in FIG. 7. It is noted that the JPEG data SUM is formed of the JPEG header SUM and the JPEG raw data SUM as described above.

A frame number i is set to "0" in a step S49, and it is determined whether or not the vertical synchronizing signal is issued in a step S51. If the vertical synchronizing signal is issued, the fetching process of one frame image is carried out in a step S53. More specifically, the JPEG header created on its own is written into the SDRAM 26, and the compression process is instructed to the JPEG CODEC 32. The JPEG CODEC 32 reads out the YUV data worth one frame from the SDRAM 26, applies the compression process to the read YUV data, and writes the compressed JPEG raw data into the SDRAM 26 as shown in FIG. 2. As described above, the JPEG data of the frame is formed by the JPEG header and the JPEG raw data obtained as to the same frame, and the markers SOI and EOI are written into the head and the end of the JPEG data.

A process instruction is applied to the signal processing circuit 38 so as to carry out the fetching process of the sound data equal to one frame in a step S55. The signal processing circuit 38 writes into the SDRAM 26 as shown in FIG. 2 the sound data equal to one frame applied from the A/D converter 36 and held in the SRAM 38a.

Upon completion of the process in the step S55, a value of "i % 3" is determined in a step S57. "i % 3" indicates a remainder when the frame number i is divided by "3", and the value that the remainder indicates is determined in the step S55. The process directly advances to a step S63 unless the remainder is "2". However, if the remainder is "2", the index information is written into the SDRAM 26 in a step S59, and "Write file" is set to the instruction list 46a shown in FIG. 4 in a step S61 before advancing to a step S63.

As described above, on the movie file shown in FIG. 7, one audio chunk is formed of the sound data of a time period equal to three frames, and one video chunk is formed of the JPEG data worth three frames. In addition, in the index chunk, the location on the file and the size of the sound data are administered by each time period equal to three frames, and the location on the file and the size of the JPEG data is administered by each one frame.

Thus, in a step S59, regarding the latest three frames, the location information and the size information of the sound data equal to these three frames, and the location information and the size information of the JPEG data of the respective frames are created, and such the created index information are written into the SDRAM 26 as shown in FIG. 3.

As shown in FIG. 2, while the sound data worth three frames are successive on the SDRAM 26, the JPEG data worth three frames (JPEG header and JPEG raw data) are sporadically distributed on the SDRAM 26. Due to this, a total of seven "Write file" are set to the instruction list 46a in a step S61. As to "Write file" set firstly out of seven "Write file", the SDRAM address indicates a starting address of the sound data worth three frames to be noticed, and the data size indicates a size of the sound data worth three frames to be noticed.

As to "Write file" set second, forth, and sixth, the SDRAM address indicates a starting address of three frames of the JPEG header to be noticed, and the data size indicates a size of three frames of the JPEG header to be noticed. As to "Write file" set third, fifth, and seventh, the SDRAM address indicates a starting address of three frames of the JPEG raw data to be noticed, and the data size indicates a size of three frames of the JPEG raw data to be noticed. As a result of the BG process toward such the setting of the instruction list 46a, the audio chunk and the video chunk are to be alternately distributed on the movie file as shown in FIG. 7.

The frame number i is incremented in a step S63, and in a succeeding step S65, it is determined whether or not the shutter button 50 is operated. Unless the shutter button 50 is depressed, the processes of steps S51–S63 are repeated, and the JPEG header, the JPEG raw data, and the sound data created in the respective frames are mapped in the SDRAM 26 as shown in FIG. 2.

If the shutter button 50 is depressed, the process advances to a step S67 so as to determine the value of "i % 3". Herein, if "i % 3" is "2", the process directly advances to a step S71. However, if "i % 3" is "0" or "1", the process sets "Write file" to the instruction list 46a in a step S69 before advancing to the step S71.

In a case that "i % 3" is "0", the last audio chunk and the video chunk are formed of the sound data and the JPEG data worth one frame, a total of three "Write file" are set to the instruction list 46a. In a case that "i % 3" is "1", the last audio chunk and the video chunk are formed of the sound data and the JPEG data worth two frames, a total of five "Write file" is set to the instruction list 46a. The SDRAM address and the data size set to the respective "Write file" indicate a starting address and a size of the sound data, the JPEG header, and the JPEG raw data as described above. Thereby, the audio chunk formed of the sound data worth one frame or two frames, and the video chunk formed of one frame or two frames of the JPEG data are formed in the movie file.

In a step S71, "Write file" is set to the instruction list 46a in order to write the index information shown in FIG. 3 into the movie file. The SDRAM address and the data size set here indicate a starting address and a total size of the index information shown in FIG. 3. As a result of "Write file" being executed by the BG process, the index chunk including all index information shown in FIG. 3 are formed at the end of the movie file.

In a step S73, the total size of the movie file is calculated based on the size information included in the index information, and the calculated total size data is written into the SDRAM 26. In succeeding steps S75–S79, "write file", "Close file", and "End BG process" are set to the instruction list 46a. The SDRAM address and the data size set in "Write file" indicate the head address and the data size of the total size data. In addition, FILE_CLOSE is set as the command as to "Close file", and FILE_END is set as the command as to "End BG process". As a result of "Write file" being executed by the BG process, the total size value is added to the size information of the movie file header. Furthermore, as a result of "Close file" being executed by the BG process, the size information of the directory entry (size information written based on the process in the step S35) is updated from "0" to the total size value, and the FAT information in the FAT area 44b is updated in such a manner that a link is created in a writing area for the movie file created this time. The BG process is ended by "End BG process".

It is noted that in order to write the total size value into the movie file header, it is needed to update a writing destination address, and in reality, "seek process" is set to the instruction list 46a prior to setting of "Write file" in the step S75.

Figure 16:
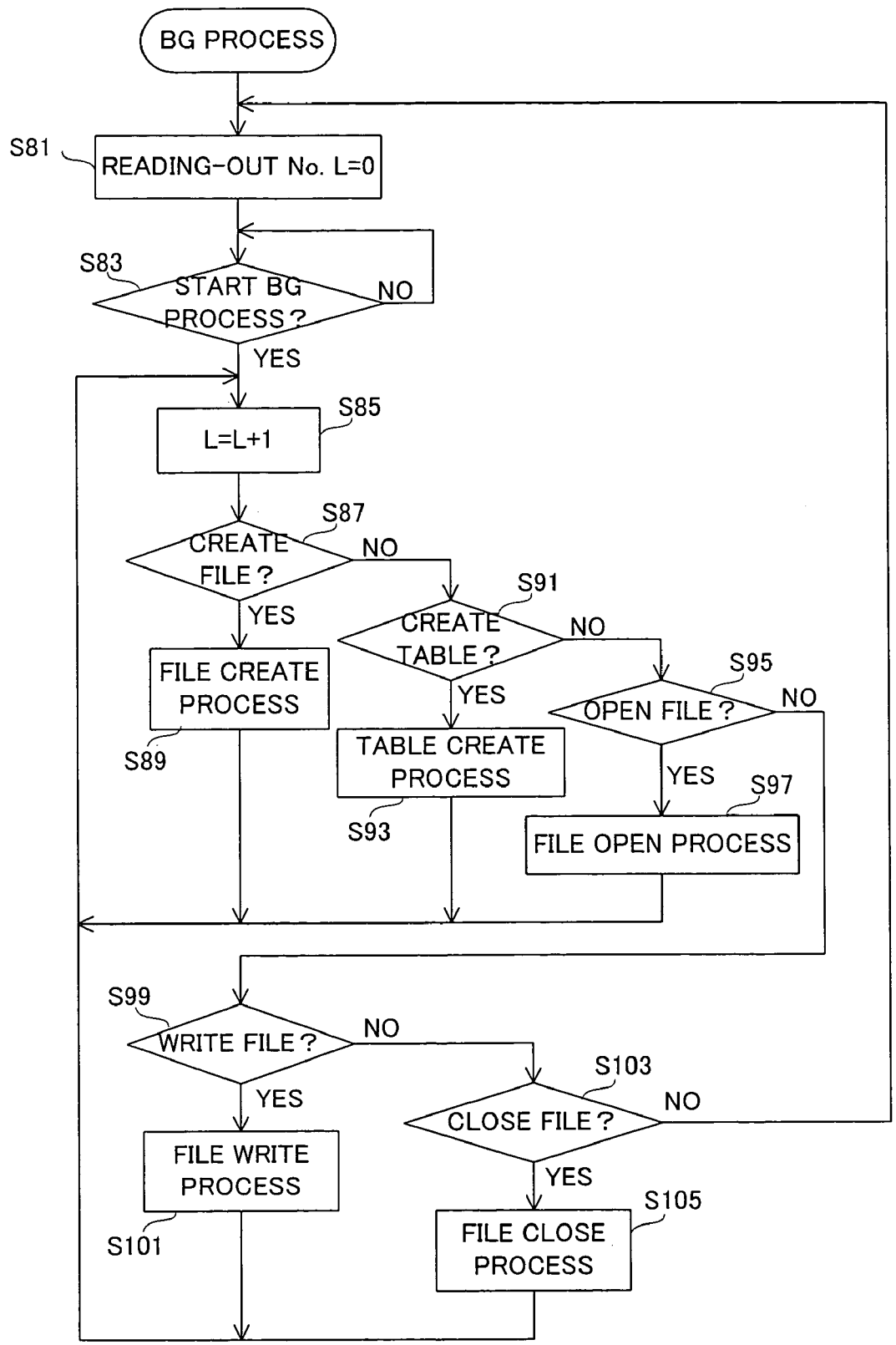
FIG. 16 is a flowchart showing one portion of the CPU operation when a BG process is carried out.
Figure 17:
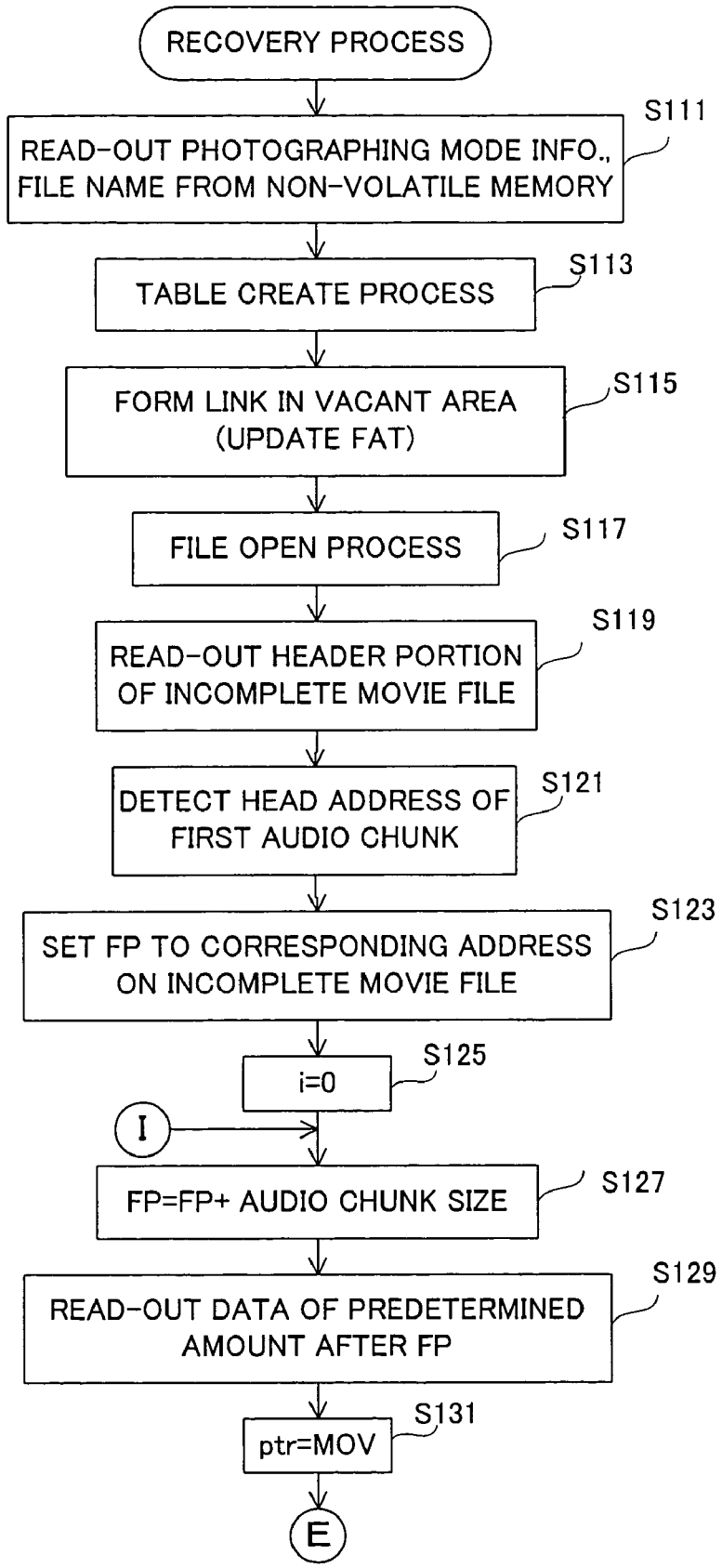
FIG. 17 is a flowchart showing one portion of the CPU operation when a recovering process is carried out.
Figure 18:
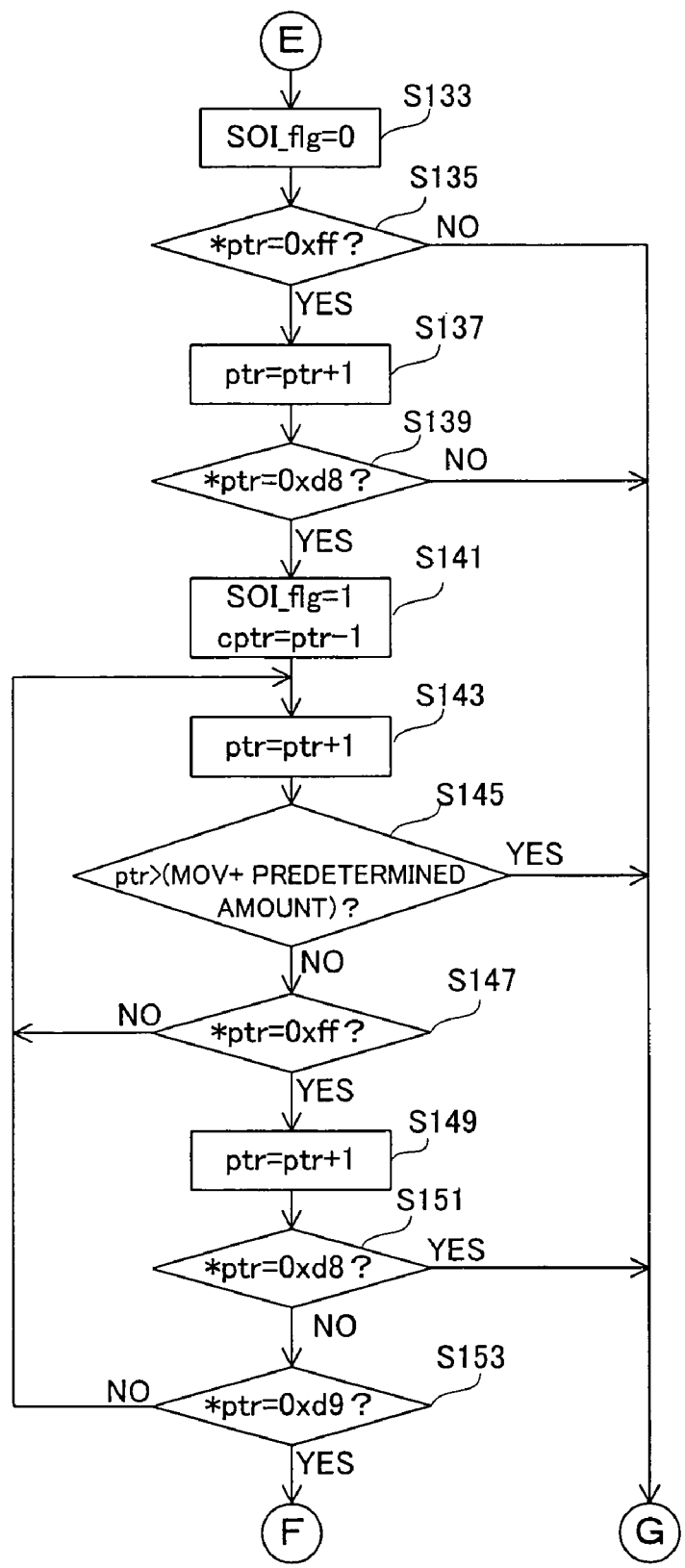
FIG. 18 is a flowchart showing another portion of the CPU operation when the recovering process is carried out.
Figure 19:
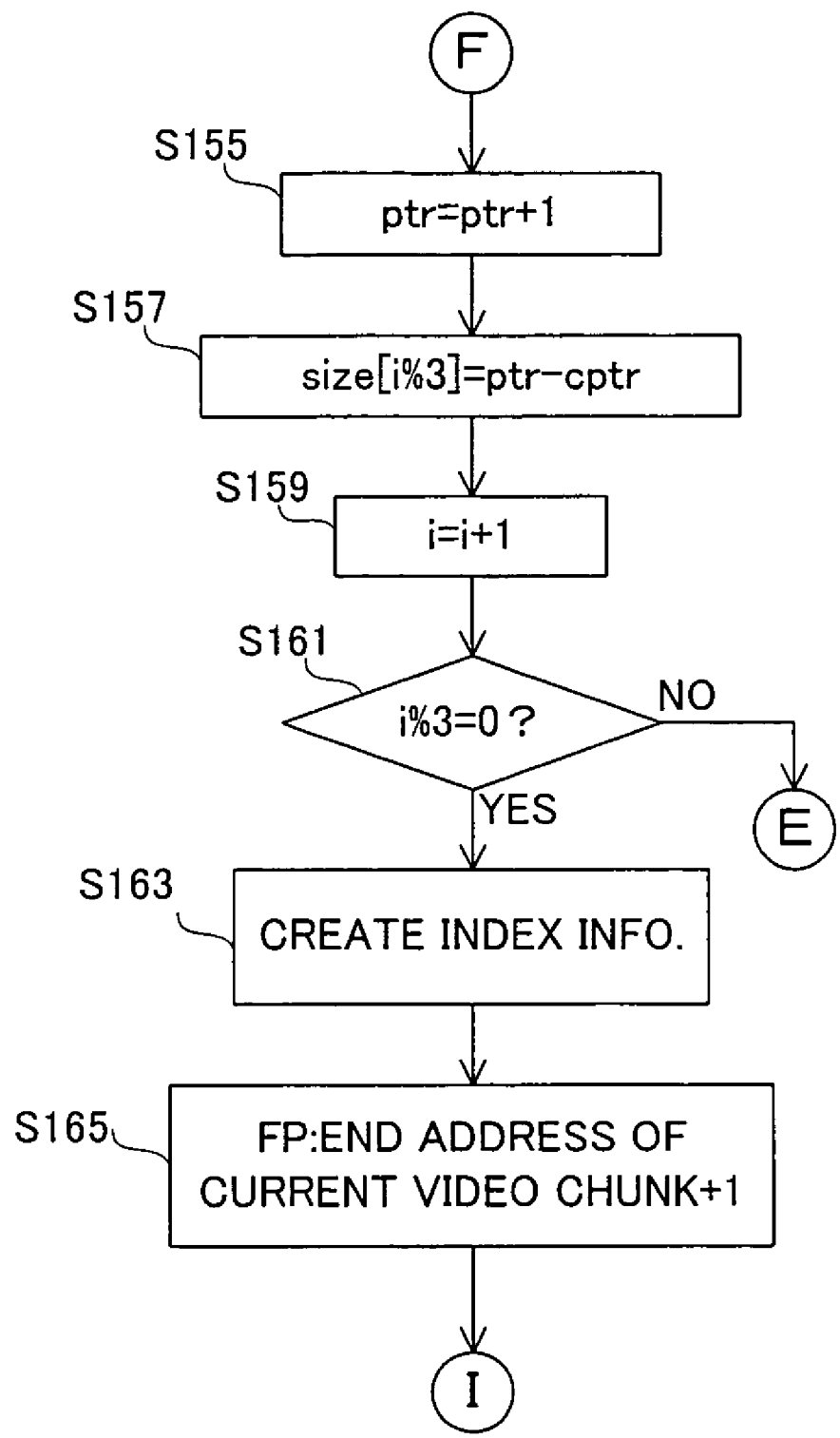
FIG. 19 is a flowchart showing the other portion of the CPU operation when the recovering process is carried out.

The BG process follows a flowchart shown in FIG. 16. Firstly, in a step S81, the list number L of a writing destination is set to "0", and in a succeeding step S83, it is determined whether or not the command read-out from the list number L is FILE_STRT. Herein, if YES is determined, the list number L is incremented in a step S85, and a content of the command read-out from the incremented list number L is determined in steps S87, S91, S95, S99, S103, and S107, respectively.

If the read command is FILE_CREATE, YES is determined in the step S87, and a file creating process is carried out in the step S89. More specifically, the recording medium 44 is specified by the drive number set to the parameter 1, and the file name and the size information showing size 0 are written into the directory entry of the recording medium 44 based on the file pass set to the parameter 2. Upon completion of the process, the process returns to the step S85.

If the read command is FILE_SET_ALLOC, YES is determined in the step S91, and a table creating process is carried out in the step S93. That is, the recording medium 44 is specified by the drive number set to the parameter 1, and a vacant area table 46b shown in FIG. 6 is created by referring to the FAT information. Upon completion of the process, the process returns to the step S85.

If the read command is FILE_OPEN, the process advances from the step S95 to the step S97 so as to carry out a file open process. That is, the recording medium 44 is specified by the drive number set to the parameter 1, a file is specified based on the file pass set to the parameter 2, and the handle number assigned to the file is created. The created handle number is used for the photographing process. Upon completion of the process, the process returns to the step S85.

If the read command is FILE_WRITE, the process advances from the step S99 to the step S101 so as to carry out a file writing process. More specifically, the movie file of the writing destination is specified by the handle number set to the parameter 1, a reading start address and a reading size are specified according to the SDRAM address and the data size set to the parameter 2 and 3, and the data read-out from the SDRAM 26 based on the reading start address and the reading size are written into the movie file specified by the handle number. Furthermore, the data size read-out from the instruction list 46a is accumulated, and the FAT information showing a link state of a writing cluster is created at every time that the writing worth one cluster is completed. An accumulated value of the data size and the FAT information are held in the SDRAM 26. Upon completion of the process, the process returns to the step S85.

If the read command is FILE_CLOSE, the process advances from the step S103 to the step S105 so as to carry out a file close process. More specifically, the size information assigned to the file name of an opened movie file is updated by the total size value held in the SDRAM 26, and the FAT information in the FAT area 44*b* is updated by the FAT information held by the SDRAM 26. Upon completion of the process, the process returns to the step S85.

If the read command is FILE_END, NO is determined in the step S103, and the process returns to the step S85. The BG process moves to a waiting state.

When the process moves to the recovery process for a reason that the incomplete movie file is present in the recording medium 44, the CPU 46 carries out processes shown in FIG. 17–FIG. 20. Firstly, in a step S111, the photographing mode information and the file name of the incomplete movie file are read-out from the non-volatile memory M, the vacant area table 46*a* shown in FIG. 6 is created in a step S113, and the FAT information is updated in such a manner that a link is formed in the respective vacant areas (vacant cluster) formed in the data area 44*c* in a step S115. The incomplete movie file shown in FIG. 8 is recorded in the vacant areas in which the link is formed, and the incomplete movie file is opened based on the file name detected from the non-volatile memory M in a step S117.

In a step S119, header portion data of the opened incomplete movie file (data including a portion of the movie file header and the first audio chunk) is read-out from the data area 44*c*, and the read header portion data is written into the SDRAM 26. The data size of the movie file header is determined in advance, so that the head address of the first audio chunk is detected from the header portion data stored in the SDRAM 26 in a step S121, and the file pointer FP is set to the address on the movie file corresponding to the detected head address in a step S123. The file pointer FP is set to the head address of sound data 0 as shown in FIG. 8.

Upon completion of the process in the step S123, the frame number i is set to "0" in a step S125, and the file pointer FP is advanced by one audio chunk in a step S127. The size of the audio chunk is calculated based on the photographing mode information detected from the non-volatile memory M, and the updated file pointer FP points to the head address of the video chunk. In a step S129, the data of a predetermined amount present subsequent to the updated file pointer FP is read-out from the data area 44*c*, and the read data is written into the SDRAM 26. This predetermined amount is an amount equal to the JPEG data worth four frames, and also calculated based on the photographing mode information read-out from the non-volatile memory M. One video chunk, one audio chunk, and a portion of the JPEG data are included in this order in the read data, and these data are mapped in the SDRAM 26 as shown in FIG. 9.

In a step S131, a pointer ptr is set to an address MOV shown in FIG. 9. The address MOV is the head address of the data of the predetermined amount stored in the SDRAM 26. If the pointer ptr is set, a flag SOI_flg is reset in a step S133, and "*ptr" is compared with "ff" in a step S135. In a step S137, a setting destination of the pointer ptr is advanced by one address, and "*ptr" is compared with "d8" in a step S139.

"*ptr" means an address value of the setting destination of the pointer ptr, and a meaning of "0x" is hexadecimal. As described above, the value of the marker SOI is described "ffd8" by using 16 bit, and the respective addresses of the SDRAM 26 are 8 bits so that "ffd8" is described by using two addresses. The steps S135–S139 are processes for determining whether or not the marker SOI is written in the two addresses to be noticed.

Unless the marker SOI is detected, NO is determined in one of the step S135 and step S139. In this case, the process moves to a step S171, considering that the data of the predetermined amount stored in the SDRAM 26 is inappropriate data, which is not structured of the incomplete movie file. On the other hand, if the marker SOI is detected, the process advances from the step S139 to a step S141 so as to set the flag SOI_flg to "1", and a pointer cptr to "ptr-1". The pointer cptr points to the head address of the video chunk.

In a step S143, the pointer ptr is updated by one address, and in a succeeding step S145, the setting destination address of the pointer ptr is determined. Herein, if the setting destination address does not exceed "MOV+predetermined amount", processes of steps S147–S153 are carried out. In the step S147, "*ptr" is compared with "ff", and the setting destination of the pointer ptr is updated by one address in the step S149, "*ptr" is compared with "d8" in the step S151, and "*ptr" is compared with "d8" in the step S153. "ffd8" indicates 16 bits value of the marker SOI, "ffd9" indicates 16 bits values of the marker EOI. Thus, the steps S147–S153 are processes for determining whether or not the marker SOI or EOI is written in the two addresses to be noticed.

Unless the first address value out of the two addresses to be noticed is "ff", the process returns to the step S143 without determining the next address value. If the first address value is "ff", it is determined whether or not the next address value is "d8" in the step S151, and it is determined whether or not the next address value is "d9" in the step S153. When the address value shows "d8", the process advances from the step S151 to the step S171, when the address value shows "d9", the process advances from the step S153 to a step S155, and when the address value shows neither "d8" nor "d9", the process returns to the step S143.

That is, when the marker SOI is detected once again subsequent to a detection of the marker SOI by the steps S135–S139, the process advances to the step S171, considering the inappropriate data other than the incomplete movie file is included in the data of the predetermined amount stored in the SDRAM 26. Furthermore, also when the setting destination address of the pointer ptr exceeds "MOV+ predetermined amount" before the marker EOI is detected, the process advances to the step S171, considering the inappropriate data other than the incomplete movie file is included in the data of the predetermined amount. On the other hand, when the marker EOI is detected, the process advances to the step S155, considering that although not certain that the inappropriate data is stored in the SDRAM 26, at least one frame of the JPEG data forming the incomplete movie file is stored in the SDRAM 26.

In the step S155, the pointer ptr is updated by one address, in a succeeding step S157, the size of one frame of the JPEG data detected this time is calculated according to Equation 1.

$$\text{size [i \% 3]} = ptr - cptr \qquad \text{[Equation 1]}$$

In a case of assigning numerals "0"–"2" to three frames of the JPEG data structuring one video chunk, "i % 3" of Equation 1 is coincident with these assigning numbers. The pointer ptr points to the next address of two addresses in which the marker EOI is written, and the pointer cptr points to the first address out of the two addresses in which the marker SOI is written. Due to this, the size of the JPEG data detected this time is calculated by subtracting the pointer cptr from the pointer ptr.

The frame number i is incremented in a step S159, and the value of "i % 3" is determined in a step S161. Herein, if i % 3 is not equal to (≠) 0, the process returns to the step S133 in order to detect the SOI marker and the EOI marker from the remaining JPEG data included in the video chunk stored in the SDRAM 26.

In contrary, if i % 3 is equal to (=) 0, the process advances to a step S163 so as to write into the index information table 46c shown in FIG. 10 the index information of the video chunk stored in the SDRAM 26 and the audio chunk prior to this video chunk. That is, the starting location information and the size information of the JPEG data of the respective frames included in the video chunk, and the starting location information and the size information of the successive audio chunks prior to this video chunk is written into the index information table 46c. In a step S165, the same video chunk as the video chunk stored in the SDRAM 26 is specified from the movie file, and the file pointer FP is set to the next address of the end address of the specified video chunk. Upon completion of the process in the step S165, the process returns to the step S127.

It is noted that due to a reason that the index information is created only when it is determined that i % 3 is equal to (=) 0, in a case that the JPEG data forming the incomplete movie file and the inappropriate data not forming the incomplete movie file are mixedly present in the data of the predetermined amount stored in the SDRAM 26, all of such the mixedly present data are rendered invalidated.

Figure 20:
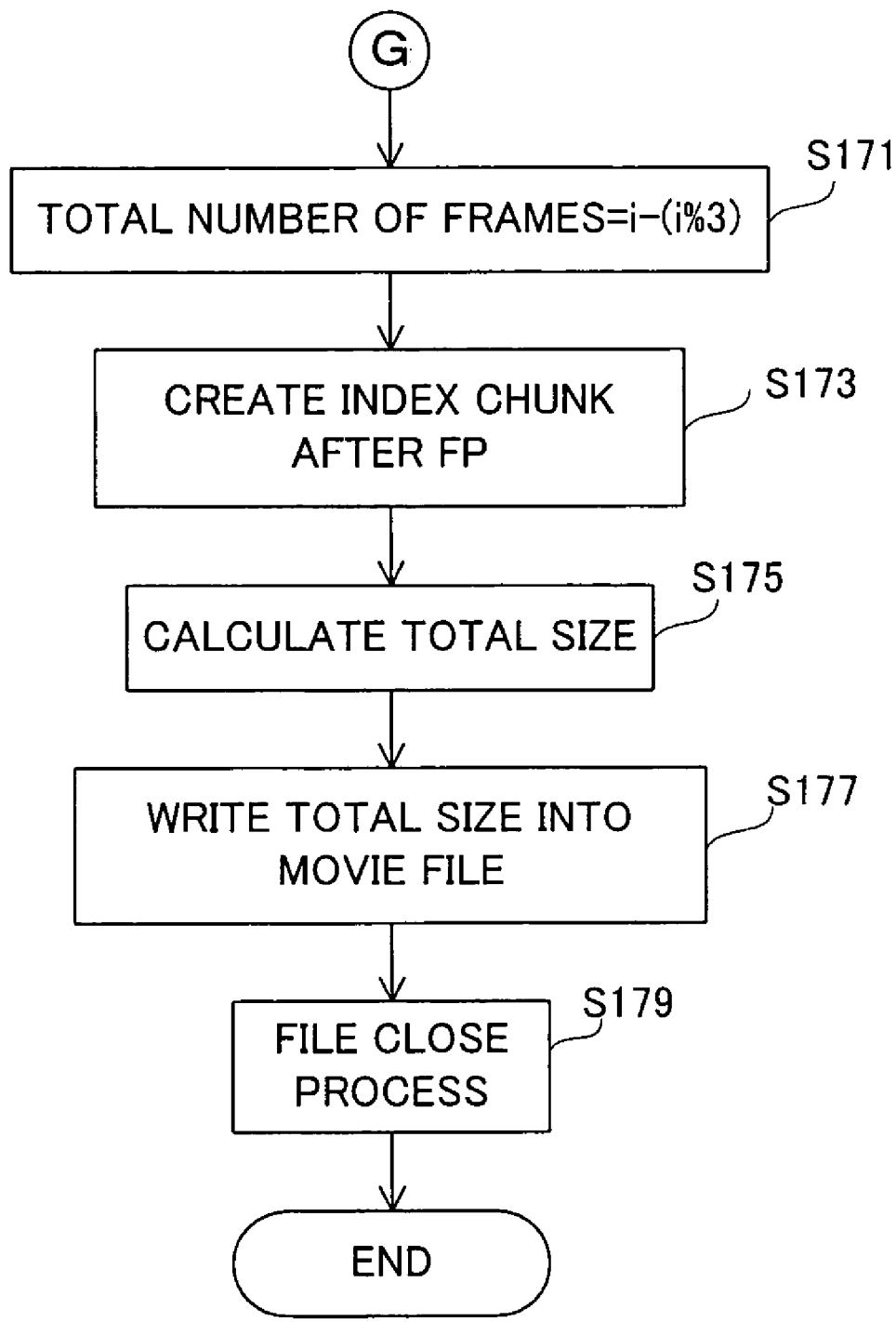
FIG. 20 is a flowchart showing a further portion of the CPU operation when the recovering process is carried out.

When advancing to the step S171 shown in FIG. 20, firstly, Equation 2 is operated in this step so as to find the number of total frames of the JPEG data to be validated. According to Equation 2, "i % 3", i.e. the number of frames of the JPEG data to be invalidated is subtracted from the current frame number i. The calculated total number of the frames is added to the header information of the movie filer header.

$$\text{the total number of frames} = i - (i \% 3) \quad [\text{Equation 2}]$$

In a succeeding step S173, the index chunk including the index information written in the index information table 46c shown in FIG. 10 is created subsequent to the file pointer FP. In a step S175, the total size value of the incomplete movie file to be validated is calculated based on the size information written in the index information table 46c. In a step S177, the calculated total size value is added to the header information of the movie file header, the file close process is carried out in the step S177. In the file close process, the size information showing the calculated total size is written into a column of the incomplete movie file in the directory entry, and the FAT information is updated in such a manner that the link formed in the writing area of the validated incomplete movie file is validated, and the link formed in the writing area for a portion of the sound data and the JPEG data to have been invalidated, and in the writing area for the inappropriate data subsequent thereto is rendered invalidated. Upon completion of the file close process, the recovery process is ended.

As understood from the above descriptions, when the shutter button 50 is operated, the file name and the size information showing "0" are written into the directory entry of the recording medium 44, and the movie file including the JPEG data of the respective frames in which the markers SOI and EOI are assigned to the head or the end is recorded in the data area 44b of the recording medium 44. Upon completion of recording the movie file, the FAT information showing a link state of the movie file is written into the FAT area 44a of the recording medium 44, and the size information is updated by the total size of the movie file.

Herein, the latest size information written in the directory entry is detected by the CPU 46 when the driving power is input. When the detected size information shows "0", the markers SOI and EOI are detected from the data area 44c, considering that the incomplete movie file is present in the data area 44c. The CPU 46 creates the FAT information based on a detection result of the markers SOI and EOI, writes the created FAT information into the FAT area 44b, and updates the detected size information by the total size of the incomplete movie file.

Thus, the FAT information is created based on the markers SOI and EOI recorded in the data area 44c, so that the incomplete movie file can be validated even in a case that the power is accidentally cut-off when the photographing is under progress.

It is noted that in this embodiment, an FAT system is adopted as a recording system of the moving image signal. However, a UDF (Universal Disk Format) system may be adopted in stead thereof.

In addition, according to a JPEG format, markers such as an APP0 (Application Marker Segment 0), a DQT (Define Quantization Table), a DHT (Define Haffman table), an SOF (Start Of Frame), an SOS (Start Of Scan), and etc. are assigned to the compressed image data of the respective frames in addition to the above-described SOI and EOI. Therefore, the movie file may be recovered using these markers.

Furthermore, this embodiment is described using a digital camera. However, it is needless to say that the present invention is applicable to a fixed-type hard disk recorder for recording a TV program, for example.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A content recording apparatus that writes, when a recording instruction is issued, into a first area of a recording medium predetermined information indicating a predetermined value, records into a plurality of partial areas sporadically distributing in a second area of said recording medium a content to which a plurality of markers are assigned in a predetermined manner, and after completing recording the content, writes into a third area of said recording medium link information indicative of a link state among partial areas in which the content is recorded and updates a value indicated by the predetermined information, written in said first area, comprising:
   a predetermined information detector for detecting the latest predetermined information out of the predetermined information written in said first area when a driving power is input;
   an area detector for detecting from said second area partial areas in a non-link state based on the link information written in said third area when the predetermined information detected by said predetermined information detector indicates the predetermined value;
   an information creator for creating link information indicative of a link state among the partial areas detected by said area detector;
   a marker detector for detecting the markers from the partial areas detected by said area detector; and
   a writing/updating processor for writing into said third area partial link information based on a detection result of said marker detector out of the link information created by said information creator, and updating a value indicated by the predetermined information detected by said predetermined information detector.

2. A content recording apparatus according to claim 1, wherein the predetermined value indicates zero, and said area detector carries out an area detecting operation when the predetermined information indicates zero.

3. A content recording apparatus according to claim 1, further comprising:
a producer for producing an identifier which identified the content when the recording instruction is issued;
an assigner for assigning the identifier produced by said producer to the predetermined information; and
a holder for holding the identifier, produced by said producer in a non-volatile manner, wherein said predetermined information detector detects latest predetermined information based on the identifier held by said holder, and the identifier assigned to the predetermined information written in said first area.

4. A content recording apparatus according to claim 1, further comprising:
a fetcher for fetching the content; and
a processor for executing in parallel with each other a first process for writing into a buffer memory the content fetched by said fetcher, and a second process for recording into said second area the content stored in said buffer memory.

5. A content recording apparatus according to claim 1, further comprising:
a plug for fetching a commercially-used power; and
a converter for converting the commercially-used power into the driving power.

6. A content recording apparatus that writes, when a recording instruction is issued, into a first area of a recording medium predetermined information indicating a predetermined value, records into a second area of said recording medium a content to which a plurality of markers are assigned in a predetermined manner, and after completing recording the content, writes into a third area of said recording medium recording location information of the content and updates a value indicated by the predetermined information, comprising:
a predetermined information detector for detecting the predetermined information from said first area when a driving power is input;
a marker detector for detecting from said second area the plurality of markers corresponding to the predetermined information when the predetermined information detected by said predetermined information detector indicates the predetermined value;
a creator for creating the recording location information based on a detection result of said marker detector; and
a writing/updating processor for writing into said third area the recording location information created by said creator, and updating a value indicated by the predetermined information detected by said predetermined information detector, wherein
the predetermined information is size information of the content,
the predetermined value indicates zero, and said marker detector carries out a marker detection when the size information indicates zero.

7. A content recording apparatus according to claim 6, further comprising:
a producer for producing an identifier which identified the content when the recording instruction is issued;
an assigner for assigning the identifier produced by said producer to the predetermined information; and
a holder for holding the identifier produced by said producer in a non-volatile manner, wherein said predetermined information detector detects latest predetermined information based on the identifier held by said holder, and the identifier assigned to the predetermined information written in said first area.

8. A content recording apparatus according to claim 6, further comprising:
a fetcher for fetching the content; and
a processor for executing in parallel with each other a first process for writing into a buffer memory the content fetched by said fetcher, and a second process for recording into said second area the content stored in said buffer memory.

9. A content recording apparatus according to claim 6, further comprising:
a plug for fetching a commercially-used power; and
a converter for converting the commercially-used power into the driving power.

10. A content recording apparatus that writes, when a recording instruction is issued, into a first area of a recording medium predetermined information indicating a predetermined value, records into a second area of said recording medium a content to which a plurality of markers are assigned in a predetermined manner, and after completing recording the content, writes into a third area of said recording medium recording location information of the content and updates a value indicated by the predetermined information, comprising:
a predetermined information detector for detecting the predetermined information from said first area when a driving power is input;
a marker detector for detecting from said second area the plurality of markers corresponding to the predetermined information when the predetermined information detected by said predetermined information detector indicates the predetermined value;
a creator for creating the recording location information based on a detection result of said marker detector; and
a writing/updating processor for writing into said third area the recording location information created by said creator, and updating a value indicated by the predetermined information detected by said predetermined information detector, and further comprising:
a fetcher for fetching the content; and
a processor for executing in parallel with each other a first process for writing into a buffer memory the content fetched by said fetcher, and a second process for recording into said second area the content stored in said buffer memory.

11. A content recording apparatus according to claim 10, further comprising:
a plug for fetching a commercially-used power; and
a converter for converting the commercially-used power into the driving power.

12. A content recording apparatus that writes, when a recording instruction is issued, into a first area of a recording medium predetermined information indicating a predetermined value, records into a second area of said recording medium a content to which a plurality of markers are assigned in a predetermined manner, and after completing recording the content, writes into a third area of said recording medium recording location information of the content and updates a value indicated by the predetermined information, comprising:
a predetermined information detector for detecting the predetermined information from said first area when a driving power is input;
a marker detector for detecting from said second area the plurality of markers corresponding to the predetermined information detected by said predetermined information detector indicates the predetermined value;
a creator for creating the recording location information based on a detection result of said marker detector; and
a writing/updating processor for writing into said third area the recording location information created by said creator, and updating a value indicated by the predetermined information detected by said predetermined information detector, and further comprising:
a plug for fetching a commercially-used power; and
a converter for converting the commercially-used power into the driving power.

13. A content recording apparatus that writes, when a recording instruction is issued, into a first area of a recording medium predetermined information indicating a predetermined value, records into a second area of said recording medium a content to which a plurality of markers are assigned in a predetermined manner, and after completing recording the content, writes into a third area of said recording medium recording location information of the content and updates a value indicated by the predetermined information, comprising:
a predetermined information detector for detecting the predetermined information from said first area when a driving power is input;
a marker detector for detecting from said second area the plurality of markers corresponding to the predetermined information when the predetermined information detected by said predetermined information detector indicates the predetermined value;
a creator for creating the recording location information based on a detection result of said marker detector; and
a writing/updating processor for writing into said third area the recording location information created by said creator, and updating a value indicated by the predetermined information detected by said predetermined information detector, wherein said second area is sporadically formed with a plurality of vacant portion areas, the content is recorded into said plurality of vacant portion areas, and the recording location information indicates a link state of the portion areas in which the content is recorded, and wherein the predetermined information is size information of the content, the predetermined value indicates zero, and said marker detector carries out a marker detection when the size information indicates zero.

14. A content recording apparatus that writes, when a recording instruction is issued, into a first area of a recording medium predetermined information indicating a predetermined value, records into a second area of said recording medium a content to which a plurality of markers are assigned in a predetermined manner, and after completing recording the content, writes into a third area of said recording medium recording location information of the content and updates a value indicated by the predetermined information, comprising:
a predetermined information detector for detecting the predetermined information from said first area when a driving power is input;
a marker detector for detecting from said second area the plurality of markers corresponding to the predetermined information when the predetermined information detected by said predetermined information detector indicates the predetermined value;
a creator for creating the recording location information based on a detection result of said marker detector; and
a writing/updating processor for writing into said third area the recording location information created by said creator, and updating a value indicated by the predetermined information detected by said predetermined information detector, wherein said second area is sporadically formed with a plurality of vacant portion areas, the content is recorded into said plurality of vacant portion areas, and the recording location information indicates a link state of the portion areas in which the content is recorded, and said content recording apparatus further comprising:
a fetcher for fetching the content; and
a processor for executing in parallel with each other a first process for writing into a buffer memory the content fetched by said fetcher, and a second process for recording into said second area the content stored in said buffer memory.

15. A content recording apparatus that writes, when a recording instruction is issued, into a first area of a recording medium predetermined information indicating a predetermined value, records into a second area of said recording medium a content to which a plurality of markers are assigned in a predetermined manner, and after completing recording the content, writes into a third area of said recording medium recording location information of the content and updates a value indicated by the predetermined information, comprising:
a predetermined information detector for detecting the predetermined information from said first area when a driving power is input;
a marker detector for detecting from said second area the plurality of markers corresponding to the predetermined information when the predetermined information detected by said predetermined information detector indicates the predetermined value;
a creator for creating the recording location information based on a detection result of said marker detector; and
a writing/updating processor for writing into said third area the recording location information created by said creator, and updating a value indicated by the predetermined information detected by said predetermined information detector, and further comprising:
a producer for producing an identifier which identifies the content when the recording instruction is issued;
an assigner for assigning the identifier produced by said producer to the predetermined information; and
a holder for holding the identifier produced by said producer in a non-volatile manner, wherein said predetermined information detector detects the latest predetermined information based on the identifier held by said holder and the identifier assigned to the predetermined information written in said first area, and said content recording apparatus further comprising:
a fetcher for fetching the content; and
a processor for executing in parallel with each other a first process for writing into a buffer memory the content fetched by said fetcher, and a second process for recording into said second area the content stored in said buffer memory.

16. A content recording apparatus that writes, when a recording instruction is issued, into a first area of a recording medium predetermined information indicating a predetermined value, records into a second area of said recording medium a content to which a plurality of markers are assigned in a predetermined manner, and after completing recording the content, writes into a third area of said recording medium recording location information of the content and updates a value indicated by the predetermined information, comprising:
- a predetermined information detector for detecting the predetermined information from said first area when a driving power is input;
- a marker detector for detecting from said second area the plurality of markers corresponding to the predetermined information when the predetermined information detected by said predetermined information detector indicates the predetermined value;
- a creator for creating the recording location information based on a detection result of said marker detector; and
- a writing/updating processor for writing into said third area the recording location information created by said creator, and updating a value indicated by the predetermined information detected by said predetermined information detector, wherein said second area is sporadically formed with a plurality of vacant portion areas, the content is recorded into said plurality of vacant portion areas, and the recording location information indicates a link state of the portion areas in which the content is recorded, and said content recording apparatus further comprising:
- a plug for fetching a commercially-used power; and
- a converter for converting the commercially-used power into the driving power.

17. A content recording apparatus that writes, when a recording instruction is issued, into a first area of a recording medium predetermined information indicating a predetermined value, records into a second area of said recording medium a content to which a plurality of markers are assigned in a predetermined manner, and after completing recording the content, writes into a third area of said recording medium recording location information of the content and updates a value indicated by the predetermined information, comprising:
- a predetermined information detector for detecting the predetermined information from said first area when a driving power is input;
- a marker detector for detecting from said second area the plurality of markers corresponding to the predetermined information when the predetermined information detected by said predetermined information detector indicates the predetermined value;
- a creator for creating the recording location information based on a detection result of said marker detector; and
- a writing/updating processor for writing into said third area the recording location information created by said creator, and updating a value indicated by the predetermined information detected by said predetermined information detector, and further comprising:
- a producer for producing an identifier which identifies the content when the recording instruction is issued;
- an assigner for assigning the identifier produced by said producer to the predetermined information; and
- a holder for holding the identifier produced by said producer in a non-volatile manner, wherein said predetermined information detector detects the latest predetermined information based on the identifier held by said holder and the identifier assigned to the predetermined information written in said first area, and said content recording apparatus further comprising:
- a plug for fetching a commercially-used power; and
- a converter for converting the commercially-used power into the driving power.

* * * * *